United States Patent
Eldering et al.

(10) Patent No.: US 9,602,884 B1
(45) Date of Patent: Mar. 21, 2017

(54) CREATING CUSTOMIZED PROGRAMMING CONTENT

(75) Inventors: Charles A. Eldering, Furlong, PA (US); Brian P. Shield, Marietta, GA (US); Christopher Ryan McClellen, Acworth, GA (US)

(73) Assignee: Universal Innovation Counsel, Inc. (VG)

( * ) Notice: Subject to any disclaimer, the term of this patent is extended or adjusted under 35 U.S.C. 154(b) by 335 days.

(21) Appl. No.: 13/183,109

(22) Filed: Jul. 14, 2011

Related U.S. Application Data

(63) Continuation of application No. 11/437,293, filed on May 19, 2006, now abandoned.

(51) Int. Cl.
| | |
|---|---|
| H04N 7/10 | (2006.01) |
| H04N 7/025 | (2006.01) |
| H04N 21/81 | (2011.01) |
| H04N 21/45 | (2011.01) |
| H04N 5/445 | (2011.01) |
| H04N 21/482 | (2011.01) |

(52) U.S. Cl.
CPC ....... *H04N 21/812* (2013.01); *H04N 5/44543* (2013.01); *H04N 21/4532* (2013.01); *H04N 21/482* (2013.01)

(58) Field of Classification Search
CPC ............... H04N 21/812; H04N 21/482; H04N 5/44543; H04N 21/4532
See application file for complete search history.

(56) References Cited

U.S. PATENT DOCUMENTS

| | | | |
|---|---|---|---|
| 5,559,707 | A | 9/1996 | DeLorme et al. |
| 5,659,350 | A | 8/1997 | Hendricks et al. |
| 5,758,257 | A | 5/1998 | Herz et al. |
| 5,892,535 | A | 4/1999 | Allen et al. |
| 6,192,340 | B1 | 2/2001 | Abecassis |
| 6,353,461 | B1 * | 3/2002 | Shore et al. .................. 348/722 |
| 6,636,271 | B1 | 10/2003 | Megeid |
| 6,684,249 | B1 | 1/2004 | Frerichs et al. |
| 6,772,147 | B2 | 8/2004 | Wang |
| 6,785,551 | B1 | 8/2004 | Richard |
| 6,792,615 | B1 | 9/2004 | Rowe et al. |
| 6,931,451 | B1 | 8/2005 | Logan et al. |
| 6,944,585 | B1 | 9/2005 | Pawson |
| 6,999,922 | B2 | 2/2006 | Boillot et al. |
| 7,080,392 | B1 | 7/2006 | Gershwind |
| 7,124,087 | B1 | 10/2006 | Rodriguez et al. |
| 7,146,627 | B1 * | 12/2006 | Ismail et al. .................... 725/47 |
| 7,210,159 | B2 | 4/2007 | Roop et al. |
| 7,222,354 | B1 | 5/2007 | Ching et al. |
| 7,269,687 | B2 | 9/2007 | Edling et al. |
| 7,432,940 | B2 | 10/2008 | Brook et al. |

(Continued)

OTHER PUBLICATIONS

U.S. Appl. No. 60/686,687, filed Jun. 2, 2005, Miller et al.

*Primary Examiner* — Nnenna Ekpo
(74) *Attorney, Agent, or Firm* — The Belles Group, P.C.

(57) ABSTRACT

A computer-implemented method for creating localized programming content includes receiving a broadcast signal and receiving geographic specific data from a server. The geographic specific data for presentation as geographic specific content is rendered and a combination of the broadcast signal and the geographic specific content is assembled to produce the localized programming content for display.

16 Claims, 40 Drawing Sheets

(56) References Cited

U.S. PATENT DOCUMENTS

| | | |
|---|---|---|
| 7,546,206 B1 | 6/2009 | Miller et al. |
| 7,631,327 B2 | 12/2009 | Dempski et al. |
| 2002/0002564 A1 | 1/2002 | Munetsugu et al. |
| 2002/0061067 A1 | 5/2002 | Lyons et al. |
| 2002/0087972 A1 | 7/2002 | Cragun et al. |
| 2002/0092019 A1 | 7/2002 | Marcus |
| 2002/0132616 A1 | 9/2002 | Ross et al. |
| 2002/0144262 A1 | 10/2002 | Plotnick et al. |
| 2002/0147977 A1* | 10/2002 | Hammett et al. ............... 725/47 |
| 2003/0005463 A1 | 1/2003 | Macrae et al. |
| 2003/0087650 A1 | 5/2003 | Aarnio |
| 2003/0093790 A1 | 5/2003 | Logan et al. |
| 2003/0121037 A1* | 6/2003 | Swix ............... H04H 20/10 725/34 |
| 2003/0163815 A1 | 8/2003 | Begeja et al. |
| 2003/0169174 A1 | 9/2003 | Liebenow |
| 2003/0217056 A1 | 11/2003 | Allen et al. |
| 2003/0225696 A1 | 12/2003 | Niwa |
| 2004/0001690 A1 | 1/2004 | Boston et al. |
| 2004/0123324 A1 | 6/2004 | Sazzad et al. |
| 2004/0128682 A1 | 7/2004 | Liga et al. |
| 2005/0010950 A1 | 1/2005 | Carney et al. |
| 2005/0120368 A1* | 6/2005 | Goronzy et al. ............... 725/28 |
| 2005/0197059 A1 | 9/2005 | Numakami et al. |
| 2005/0251807 A1 | 11/2005 | Weel |
| 2006/0015580 A1 | 1/2006 | Gabriel et al. |
| 2006/0026277 A1 | 2/2006 | Sutcliffe |
| 2006/0212904 A1* | 9/2006 | Klarfeld et al. ............... 725/46 |
| 2006/0239131 A1 | 10/2006 | Nathan et al. |
| 2006/0282847 A1 | 12/2006 | Gupte |
| 2006/0294561 A1 | 12/2006 | Grannan et al. |
| 2007/0005795 A1 | 1/2007 | Gonzalez |
| 2007/0074245 A1* | 3/2007 | Nyako et al. ............... 725/34 |
| 2007/0154169 A1* | 7/2007 | Cordray ............ H04N 5/44543 386/230 |
| 2007/0245392 A1 | 10/2007 | Shen |

* cited by examiner

< category = NEWS OR WORLD NEWS, NOT LOCAL NEWS

< source = BBC OR NEW YORK TIMES NOT (CNN OR FOX)

< duration = AT LEAST 60 SEC. NOT LONGER THAN 3 MIN

*FIG. 9B*

CREATING CUSTOMIZED PROGRAMMING CONTENT

CROSS REFERENCE TO RELATED APPLICATIONS

This application is a continuation of U.S. patent application Ser. No. 11/437,293, filed May 19, 2006, now abandoned entitled Creating Localized Programming Content, the entire disclosure of which is incorporated herein by reference.

This application is related to U.S. patent application Ser. No. 11/437,088, filed May 19, 2006, entitled Method and System for Combining Broadcast Signals and Communications Network Data; U.S. patent application Ser. No. 11/437,172, filed May 19, 2006, entitled Creating Personalized Content on a Digital Video Recorder; U.S. patent application Ser. No. 11/437,292, filed May 19, 2006, entitled Creating Personalized Programming Content; and U.S. patent application Ser. No. 11/437,366, filed May 19, 2006, and entitled Targeted Advertising in a Time-Constrained Program Stream, the entire disclosures of which are incorporated herein by reference.

This application is also related to U.S. patent application Ser. No. 11/621,286, filed Jan. 9, 2007, entitled System and Method for Generating User Content Streams; U.S. patent application Ser. No. 11/621,289, filed Jan. 9, 2007, entitled System and Method for Generating User Content Streams; U.S. patent application Ser. No. 11/621,305, filed Jan. 9, 2007, entitled System and Method for Generating User Content Streams; and U.S. patent application Ser. No. 11/621,310, filed Jan. 9, 2007, entitled System and Method for Generating User Content Streams

BACKGROUND

Broadcast and cable television networks provide viewers with a wide range of programming. Despite this wide range of programming choice, a viewer of broadcast or cable television is often at the mercy of the network programmers to determine the content that can be displayed at any one time.

Once it is decided, for example, that a particular sequence of shows will run at specific times and in a specific order, the editing and formatting choices of the programming are determined by the network. Often, once the display parameters of the programming have been determined, the programming is transmitted, and further choice regarding the display parameters is limited.

BRIEF SUMMARY OF EMBODIMENTS OF THE INVENTION

According to one embodiment of the present invention, a viewer is provided with the ability to choose from a plurality of programming sources, including broadcast network television, cable network television, and communications-network data streams, to create customized programming. The programming and data from these sources is combined into a user-defined customized display, such that a program relating to a broad geographic region, such as a news or weather program, may be customized with information related to a smaller geographic area within the broad geographic region.

In one embodiment, the user is provided with the option of choosing one or more network or cable channels for simultaneous display. Options for customizing the display regions are also provided. In one embodiment, the user is able to choose from a variety of different displays, including horizontal split screen, vertical split screen, L-shaped display, or other customized, user-defined display regions. The selection of a channel for the inclusion of audio is also provided.

In one embodiment, one or more data streams are selected from a communications network for rendering on the display. The data streams to be converted into a variety of display formats, including streaming or scrolling text, streaming video, or streaming audio, are rasterized for display in one or more of the display regions selected by the user.

In another embodiment, a data stream including text, or text and negligible graphical components, such as a news story or weather report, is converted into a video display comprising an audio component in which the text is converted into sound via speech-recognition software along with a video component, such as a graphically animated avatar in the form of a newscaster or weatherperson. Additionally, the graphical components from the data stream can be displayed in a separate display region.

In another embodiment, a localized news or weather program is created by selecting a network or cable television news or weather program along with a specialized data stream, such as local news, weather, or traffic, and combining these sources into a single display. For example, regional or national weather may be selected for display in the primary display area of an L-shaped display while local weather and local traffic information are displayed in two supplemental regions. In this fashion, a view is provided with a broad-based weather program that is customized to include local weather and local traffic conditions simultaneously. Additional customization can be developed for news and sports, such as national or international business news supplemented by local business news and stock quotes, or national sports coverage customized by coverage of the local team and fantasy sports updates. Accordingly, local news, weather, or traffic data from locations on a network that are closely proximate to the user may be located. Such locations include, but are not limited to, the user's local hard drive, a server located in the same neighborhood, city, county, state, national region, or nation. Thus, the news, weather, and sports data collection, whether local, regional, national, or international, is reduced to a computer-network oriented solution.

BRIEF DESCRIPTION OF THE SEVERAL VIEWS OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings:

FIGS. 9A and 9B illustrate the correlation between a subscriber content profile vector and a segment profile vector, and a representative subscriber content profile vector, respectively;

DETAILED DESCRIPTION

Figure 1:
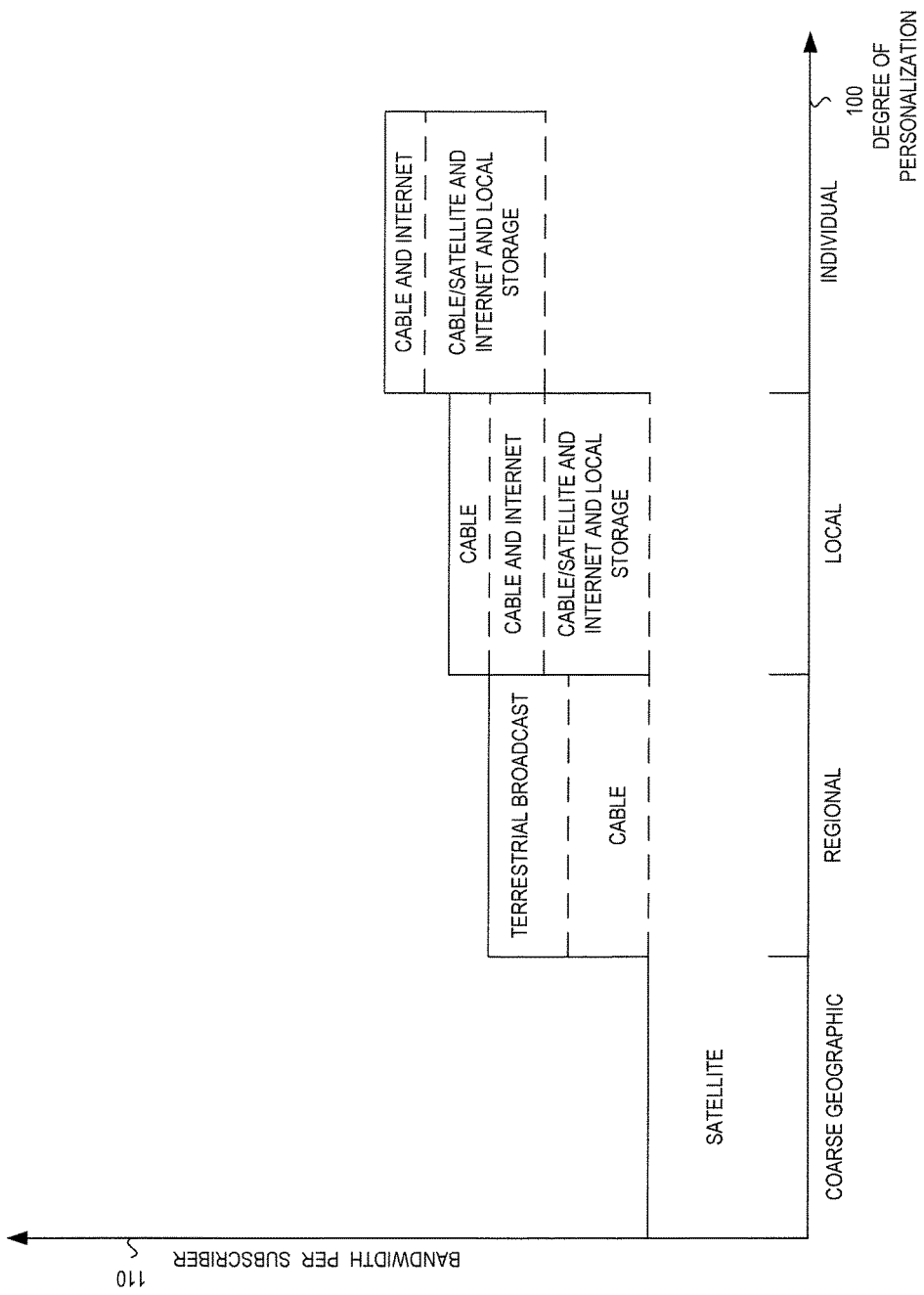
FIG. 1 illustrates the evolution of targeted services and the required bandwidth for those services in accordance with one embodiment of the present invention.

Certain terminology is used herein for convenience only and is not to be taken as a limitation on the embodiments of the present invention. In the drawings, the same reference letters are employed for designating the same elements throughout the several figures.

The words "right", "left", "lower" and "upper" designate directions in the drawings to which reference is made. The words "inwardly" and "outwardly" refer to directions toward and away from, respectively, the geometric center of the various embodiments of the present invention and designated parts thereof. The terminology includes the words above specifically mentioned, derivatives thereof and words of similar import.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present invention, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

FIG. 1 demonstrates the relationship between increasingly specific broadcast programming and the bandwidth necessary to achieve such programming. The y-axis 110 of the graph indicates bandwidth per subscriber, and the x-axis 100 indicates the degree of personalization of various programming. As can be seen in FIG. 1, coarse geographic programming can be accomplished by simple satellite transmission and requires only a relatively small amount of bandwidth per subscriber. Moving to the right along the x-axis 100, the next increase in personalization occurs. Regional specificity in programming can no longer be accomplished by pure satellite transmission. Instead, it requires additional bandwidth, such as that which can be supplied by a mix of both cable and terrestrial broadcasts. Moving farther to the right on the x-axis 100 of FIG. 1, to achieve geographically local specialization, yet more complex combinations of transmissions, and correspondingly greater bandwidth, are required. In addition to cable and terrestrial broadcasts, access to computer networks and local storage capacity become necessary to supply highly localized information. Finally, on the far right of the x-axis 100, individualized programming is represented, along with the higher bandwidth, network, and storage needs associated with it.

Figure 2A:
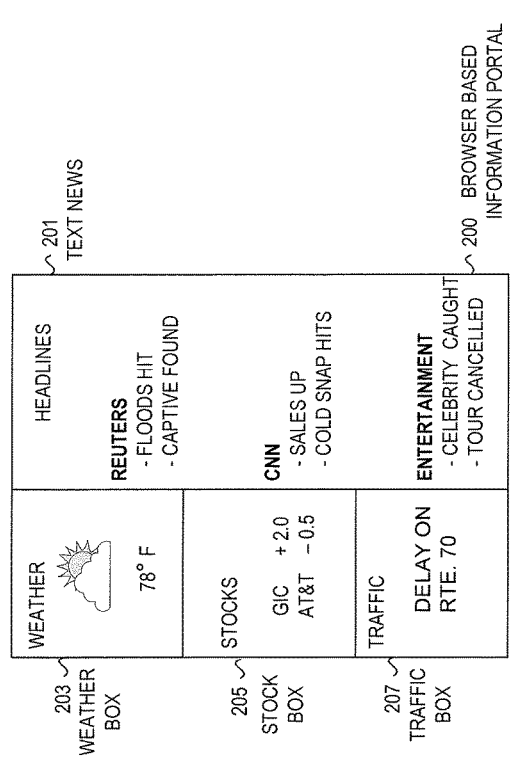
FIGS. 2A and 2B illustrate a two-dimensional browser based information portal and a linear news broadcast, respectively, in accordance with one embodiment of the present invention.
Figure 2B:
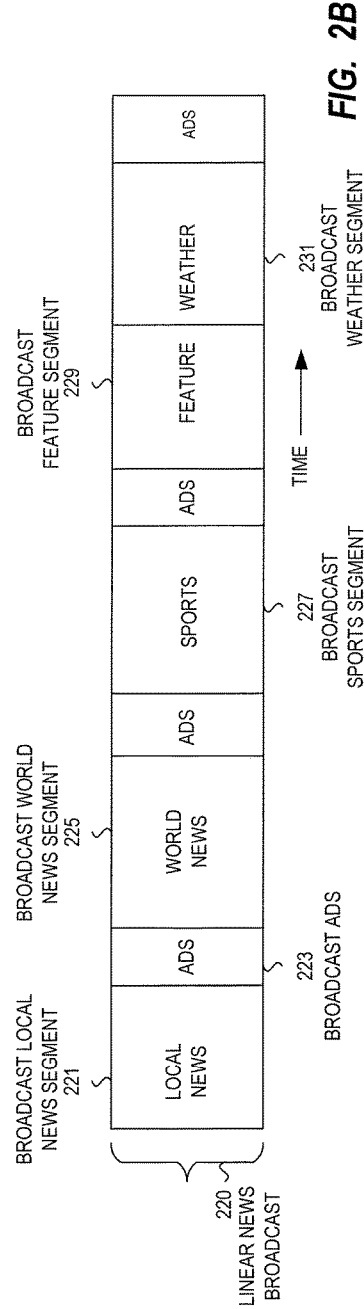

FIGS. 2A and 2B provide a graphic illustration of the types of content which can be used to create a customized program. In FIG. 2A, a two-dimensional representation of media content is provided for a customized multimedia program to be displayed on a television or monitor or to be used as an Internet browser-based information portal 200. Exemplary content includes, but is not limited to, text news 201, a weather box 203, a stocks box 205, and a traffic box 207. FIG. 2B graphically illustrates a linear news broadcast 220. Examples of such a broadcast include, but are not limited to, broadcast local news segment 221, broadcast advertisements 223, broadcast world news segment 225, broadcast sports segment 227, broadcast feature segment 229, and broadcast weather segment 231. Those skilled in the art will recognize that additional content may be provided by either the browser portal 200 or the linear news broadcast 220.

Figure 3A:
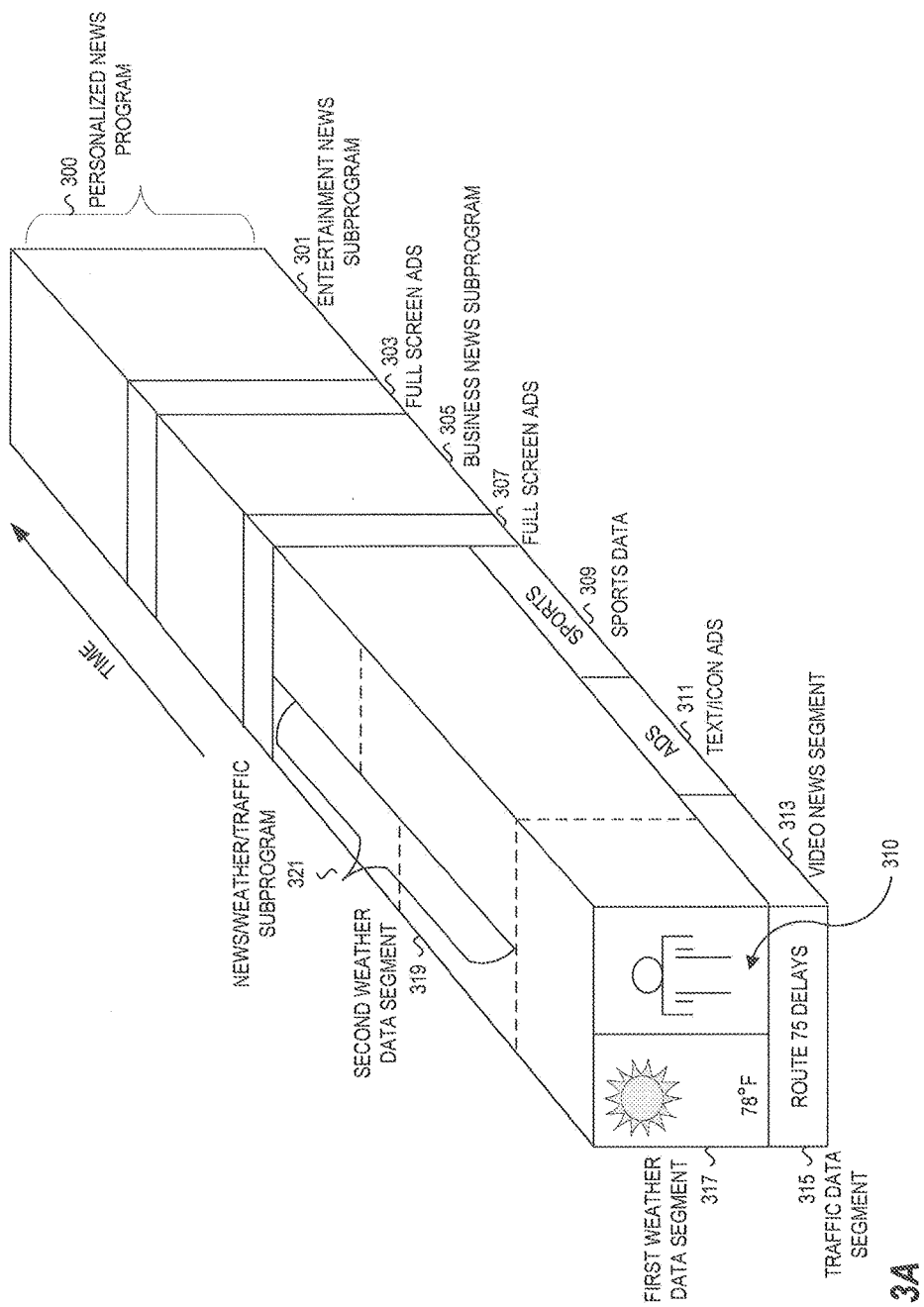
FIGS. 3A and 3B illustrate 3-dimensional and 2-dimensional views of personalized news programs, respectively, in accordance with one embodiment of the present invention.

FIG. 3A is a time-based graphical representation of content provided in a customized programming stream. Without limitation, an L-shaped video display 310 is presented over a generalized time period to form a personalized news program 300. Constituent parts of an exemplary personalized news program 300 include an entertainment news subprogram 301, a first set of full-screen advertisements 303, a business news subprogram 305, a second set of full-screen advertisements 307, sports data 309, text/icon advertisements 311, a video news segment 313, a traffic data segment 315, a first weather segment 317, a second weather segment 319, and a news/weather/traffic subprogram 321.

Figure 3B:
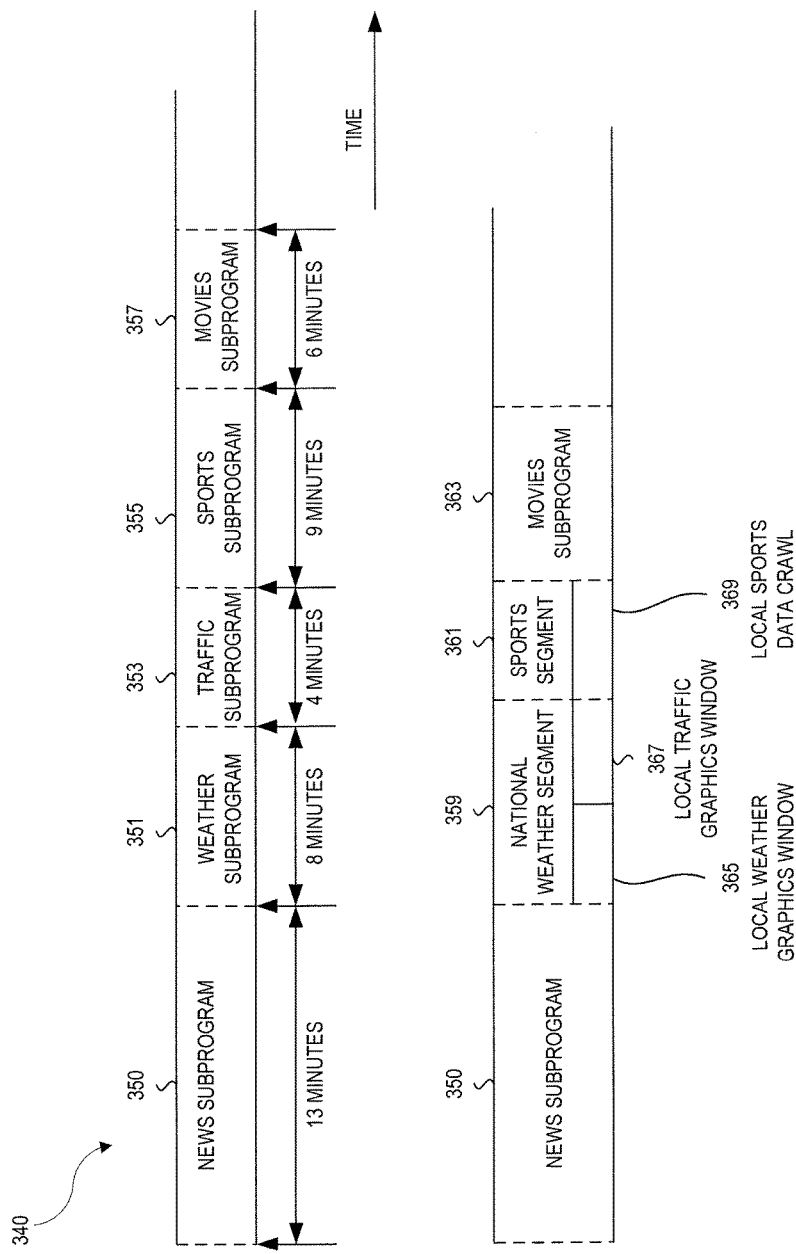

FIG. 3B presents similar information in a different form, namely, the accumulation of customized video programming in a timed sequence. In various combinations, the customized video programming 340 may consist of a news subprogram 350, a weather subprogram 351, a traffic subprogram 353, a sports subprogram 355, and a movies subprogram 357. Various elapsed time measurements are provided for each segment in the example of FIG. 3B. Additionally, the video subprograms 350, 351, 353, 355 and 357, may be combined with various other text, video, or information subprograms for simultaneous display in a variety of customized video display formats. These text, video, or information subprograms may include a local weather graphics window 365, a local traffic graphics window 367, and a local sports data crawl 369, among others.

Figure 4:
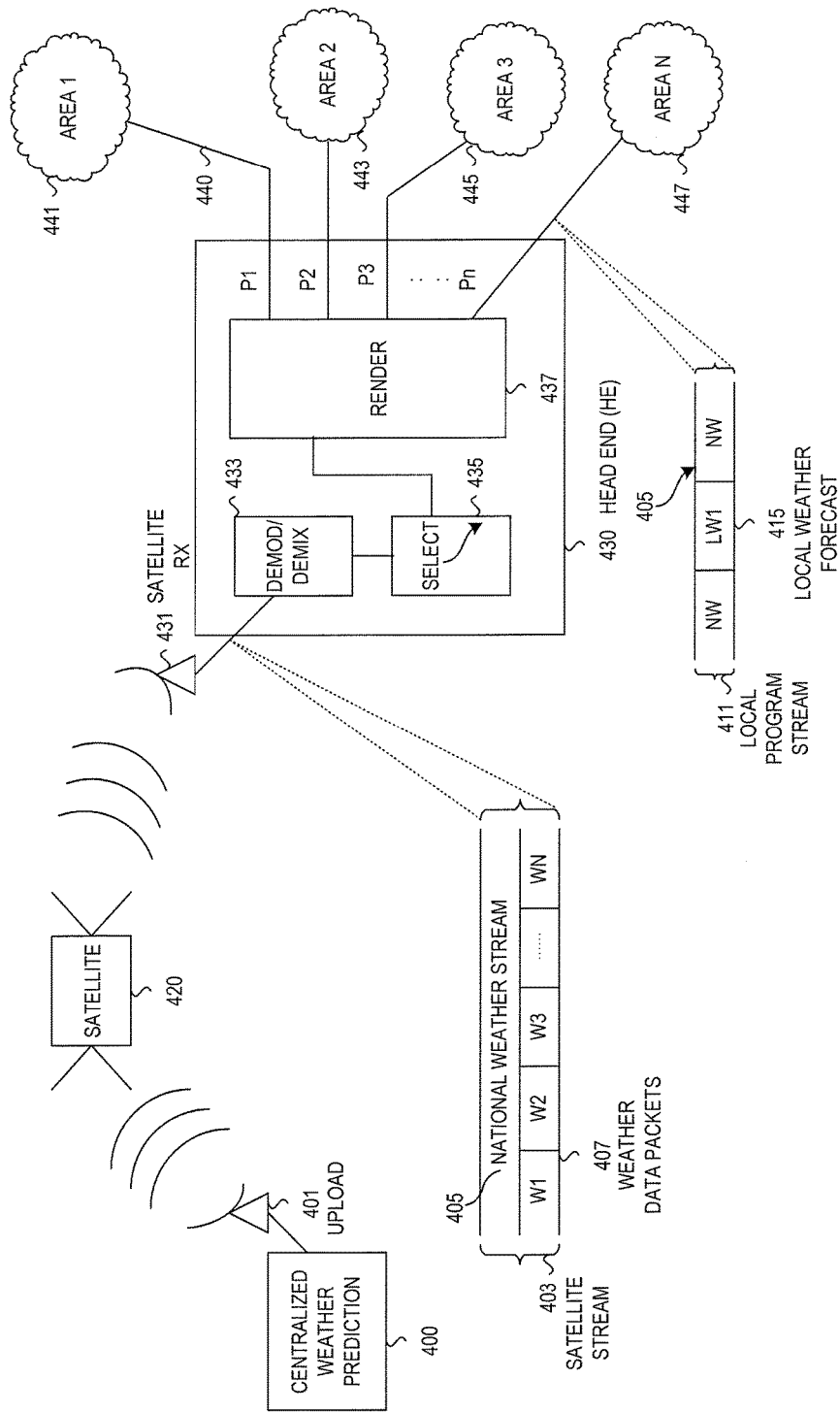
FIG. 4 illustrates a system for satellite based delivery of national weather with local weather inserts in accordance with one embodiment of the present invention.

FIG. 4 illustrates a system for providing customized and localized weather broadcasts via a cable network head-end system. A centralized weather prediction unit 400 transmits a satellite stream 403 to satellite 420 via satellite uplink 401. The satellite stream 403 preferably contains both a national weather stream 405 and a plurality of localized weather content streams in the form of weather data packets 407. Satellite 420 broadcasts satellite stream 403 to a plurality of satellite receivers 431 located at various cable head-ends 430 spread across one or more large geographical regions. At the cable head-end 430, a demodulator/demultiplexer 433 decouples the weather data packets 407 from the national weather stream 405 for selection and rending via local data selection module 435 and rendering engine 437, respectively. The rendering engine 437 produces a plurality of local programming streams 411, in which national weather content 405 is mixed with a specific local weather forecast 415 and transmitted to the appropriate local geographic area selected from a multitude of geographic areas 441, 443, 445, 447. Preferably, the programming streams 411 are transmitted to the respective geographic areas 441, 443, 445, 447 via fiber-optic connection 440, but may be transmitted via other means generally known in the art.

Figure 5:
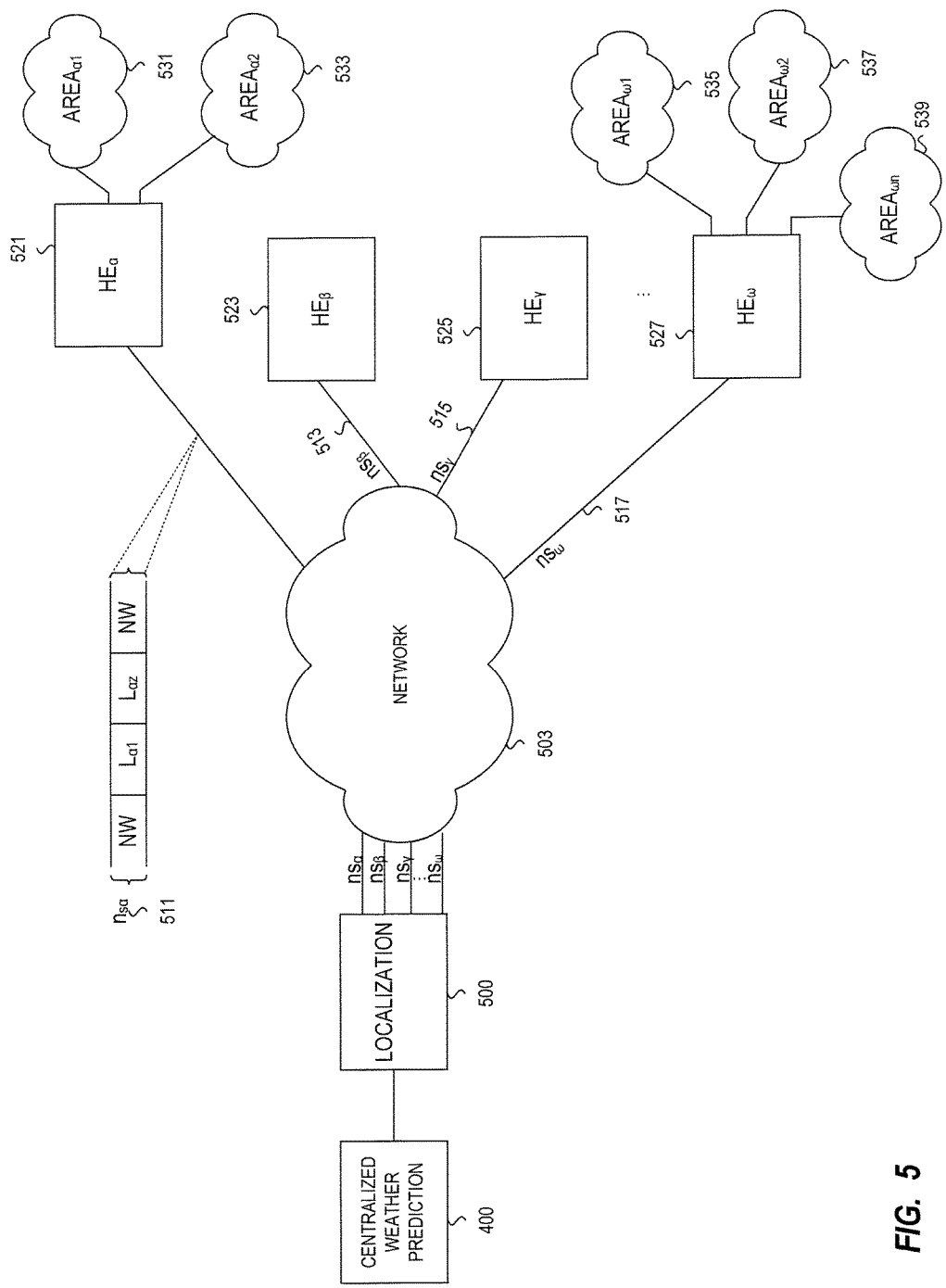
FIG. 5 illustrates a network based system for delivery of multiplexed national and regional information in accordance with one embodiment of the present invention.

FIG. 5 illustrates a computer network system for transmitting customized video programming content, again in the localized weather programming context in accordance with the present method, apparatus, and system. Centralized weather predictor 400 provides weather data to localization engine 500, which, in turn, creates a plurality of regionalized program streams 511, 513, 515, 517 that are then fed into a computer network 503, such as the Internet, and delivered to a plurality of cable head-ends 521, 523, 525, 527. The head-ends 521, 523, 525, 527 then transmit the regionalized program streams 511, 513, 515, 517 to specific geographical areas 531, 533, 535, 537, 539, preferably via fiber-optic connection 440. The computer network 503, moreover, is capable of assuring that specific regionalized program streams are delivered to the corresponding cable head-end that is geographically appropriate for the given stream. For example, regionalized program stream 511, which contains localized information for geographical area a 531 is sent to head-end 521, which is responsible for servicing geographical area a 531. It is also possible that one cable head-end, e.g., cable head-end ω 527, may service multiple geographic regions, e.g., geographical regions ω 1 535, ω2 537, and ωn 539. In such a case, the computer network 503 is capable of transmitting one or more regionalized program streams 517 to the single head-end 527 to service multiple geographical areas 535, 537, 539. A broad range of flexibility is thereby provided to the design of such networks, and strict adherence to geographically determined network architecture is not required.

Figure 6:
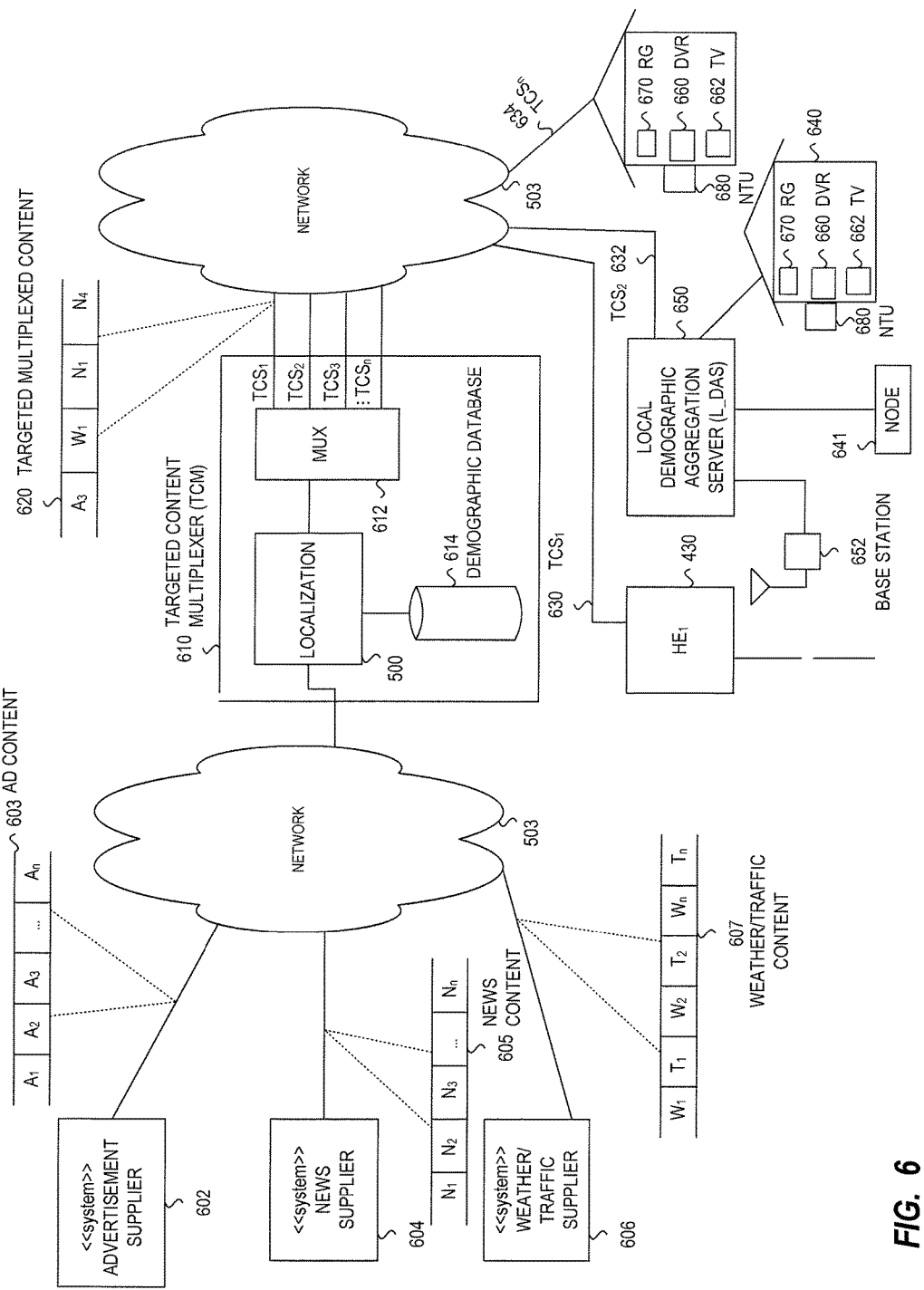
FIG. 6 illustrates a generalized system for the creation of targeted multiplexed content in accordance with one embodiment of the present invention.

FIG. 6 illustrates a network configuration in which targeted content, such as targeted advertisements, is mixed with customized programming. Advertisement content 603, news content 605, and weather/traffic content 607 is provided to a computer network 503, such as the Internet, via advertisement supplier 602, news supplier 604, and weather/traffic supplier 606, respectively. Additional content providers covering a broad range of content services can also be incorporated into the network 503. The amalgamated data is then transmitted to a Targeted Content Multiplexer (TCM) 610, where it is received by a localization engine 500. Demographic database 614 provides demographic data used to insert targeted content, such as subscriber-tailored advertisements. A multiplexer unit 612 creates a plurality of targeted multiplexed content streams 620 that are fed back into computer network 503. Computer network 503 delivers various targeted multiplexed content streams 630, 632, 634 to a variety of locations, such as a cable head-end 430, a Local Demographic Aggregation Server (L_ DAS) 650, or a residence 640. From L_DAS 650, targeted multiplexed content streams can be provided to a variety of sources, including a cellular base station 652 for receipt by cellular-enabled equipment, a node 641, preferably via a fiber-optic connection 440, and a residence 640. In one embodiment, once transmitted to the residence 640 (whether sent directly by the network 503 or via the L_DAS 650), the targeted multiplexed content stream 632 can be received by a digital video recorder (DVR) 660 for processing, storage, and eventual display on a television 662. In another embodiment, a Network Termination Unit (NTU) 680, typically affixed to the external portion of the residence, acts to demarcate the boundary between the external computer network 503 and the equipment within the residence 640, which also may include a Residential Gateway (RG) 670, that acts as a centralized location for the connection of all network-enabled residential electronic equipment, such as DVR 660, TV 662, a personal computer (not shown) or other device.

One skilled in the art would recognize that the DVR functionality can be placed at various nodes in the network, in addition to being deployed as part of the DVR, set-top box, or home computer. In one embodiment, the DVR functionality is placed at nodes intermediate the residence and head-end. In an alternate embodiment, the DVR functionality is deployed in the server providing the video, or other head-end device.

Figure 7:
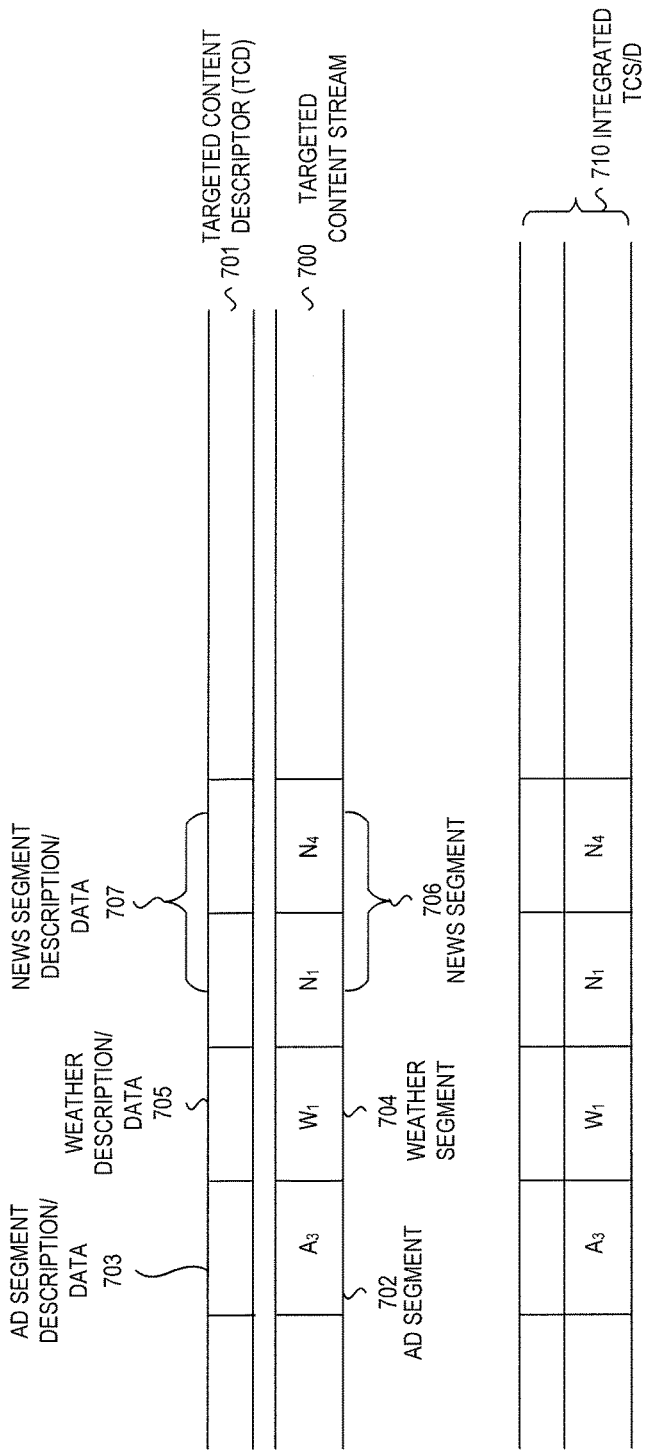
FIG. 7 illustrates targeted content streams in accordance with one embodiment of the present invention.

FIG. 7 illustrates the structure of a targeted content stream (TCS) 700 having various fields of metadata, preferably using the MPEG-7 standard for video transmission. One embodiment of the targeted multiplexed program stream 700 contains a targeted content descriptor (TCD) 701, an advertisement segment 702, an advertisement segment descriptor 703, a weather segment 704, a weather segment descriptor 705, various news segments 706, and various news segment descriptors 707. An integrated targeted content segment is also illustrated in which the various descriptors 703, 705, 707 are integrated into a single integrated stream (TCS/D) 710 along with the various corresponding video segments 702, 704, 706.

The metadata associated with the video segments of FIG. 7 can be based on the MPEG-7 standard, which can be used to describe the content in terms of production description tools (e.g. title, abstract, creator, form, genre, subject, language, release, target), media description (system or standard, bandwidth, visual coding), content structure (including segment relation tools such as before, after, starts, finishes, keyFor), visual descriptors (color, texture, shape, motion, face), and other parameters descriptive of the content (video, audio, graphic, or textual) contained within the Targeted Content Stream (TCS) 700. Alternate metadata schemes can be used, either integral to the content stream or associated with it, to provide content descriptive data in a way that is accessible for searching, recognition, and manipulation of the video segments. Metadata can be used to carry the information related to splicing, truncation, and splice points, and can provide information describing which content will be lost during truncation, or how splicing of segments will affect content flow. Splice and termination points can be identified through messages contained within the metadata.

Figure 8:
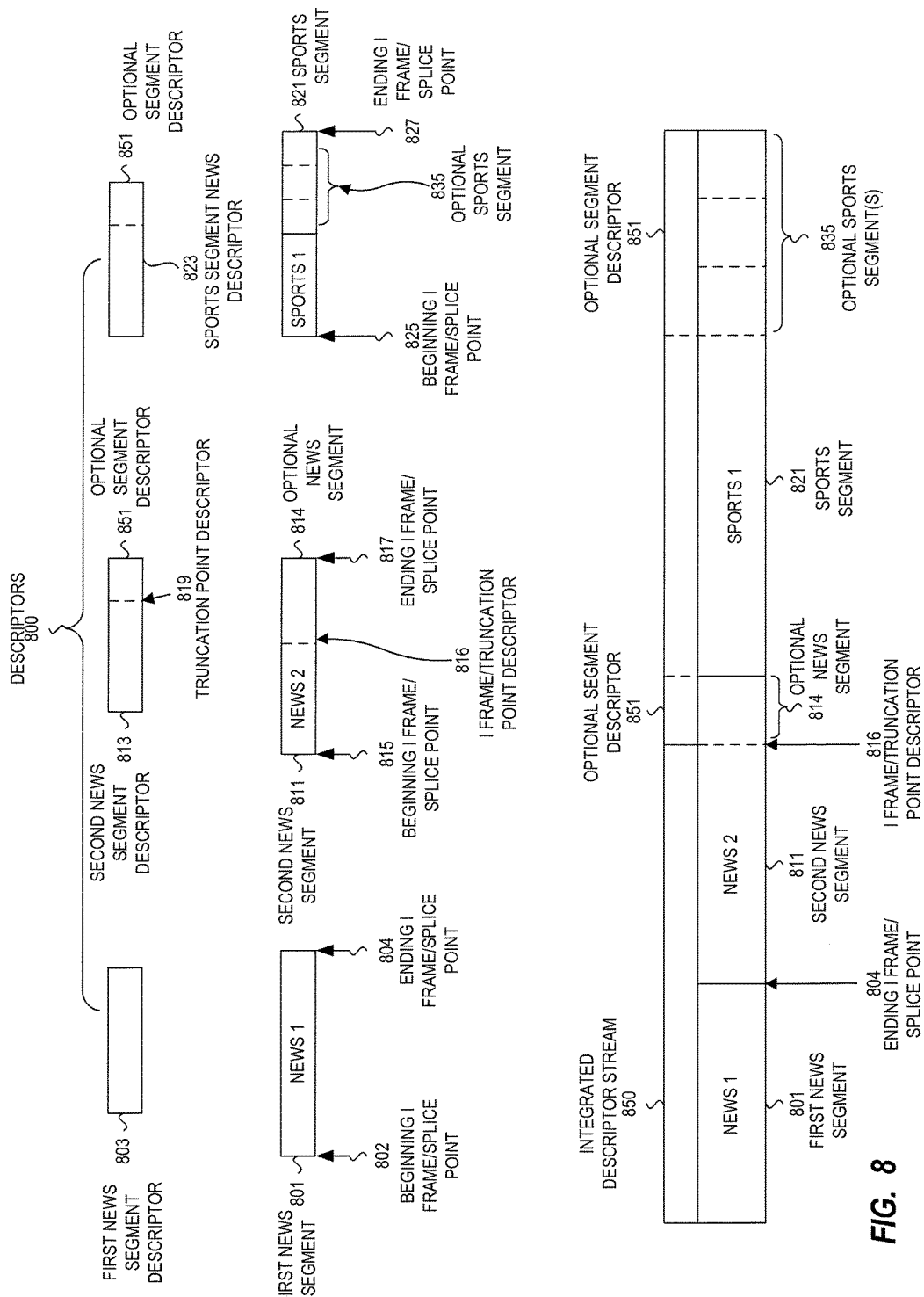
FIG. 8 illustrates video segments with splice points, optional segments, and separate and integrated descriptors in accordance with one embodiment of the present invention.

FIG. 8 illustrates the structure of targeted multiplexed program streams necessary for the splicing of various streams according to, preferably, ANSI/SCTE 35 standard for video splice points. Program segments, such as news-1 program segment 801, news-2 program segment 811, and sports-1 program segment 821, and their corresponding descriptors 800, such as news-1 program descriptor 803, news-2 program descriptor 813, and sports-1 descriptor 823 are illustrated. Accompanying each of these segments and descriptors are a plurality of I-frame/splice points. The I-frame/splice points can be I-frames, I-frames with associated metadata, or other combinations of metadata and specialized or modified video frames that can be used for splicing. For example news-1 program segment 801 is illustrated with two I-frame splice points 802 and 804 located on either end of the segment. Similarly, News-2 program segment 811 is illustrated with two I-frame splice points 815 and 817 located on either end of the segments, but is also illustrated with an I-frame truncation point 816 near the terminal end of the segment. I-frame truncation point 816 provides the boundary for optional news segment 814, and corresponds to second news segment truncation point descriptor 819, which creates optional segment descriptor 851. Segments and descriptors, however, are not limited to having only a single truncation point. Sports-1 program segment 801, for example, contains multiple I-frame truncation points near its terminal end, thereby creating multiple optional sports segments 835 and multiple optional sports segment descriptors 851.

Integrated segment and descriptor stream 850 is produced after the stream components have been assembled by the TCM system 610. As illustrated in FIG. 8, the various stream components discussed above have been assembled into a unified program stream with descriptors. News-1, news-2, and sports-1 segments, 801, 811, 821, have been assembled using the various I-frame/splice and truncation points 804 and 816. In this example, the stream 850 contains several of the optional program segments 814 and 835, along with their corresponding segment descriptors 851.

The I-frame/splice points and I-frame/truncation points illustrated in FIG. 8 can be utilized to assemble content by allowing the splicing of content into a continuous video stream, or by the truncation of the video stream followed by subsequent assembly into a continuous stream. Splicing can be accomplished using a number of protocols, including but not limited to, the SCTE 30 Digital Program Insertion Splicing Application Protocol Interface and ANSI/SCTE 35 Digital Program Insertion Cueing Message for Cable standard, which provide a standardized method for, and descriptions of, the cueing of messages and communication between servers and splicers. In one embodiment, the stored video comes from a hard drive (e.g. hard drive 3014 in FIG. 30) acting as a server and is provided to MPEG decoder 3022 which provides the splicing functionality, thus serving as a splicer. The splicing protocol provides the basis for communication of the splicing request, and monitoring of the splicing process. The result of the splicing process is an integral video stream which does not cause decoding artifacts such as buffer under/overflows due to improper splicing and insufficient or improperly located I frames.

Figure 9A:
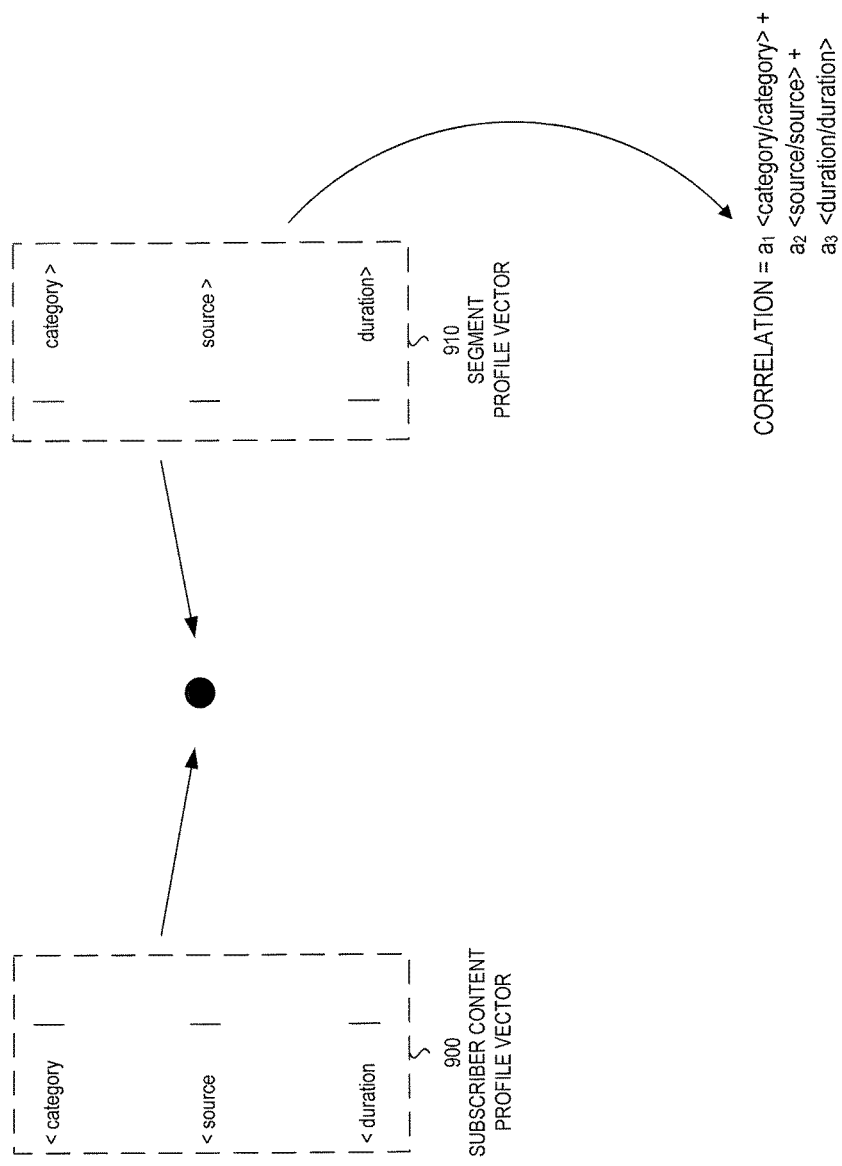

FIG. 9A illustrates various components of content profile vectors and segment profile vectors using the bra-ket notation. As illustrated, bra vectors are used to illustrate various components of the subscriber content profile vector 900, such as the category, source, and duration. Correspondingly, ket vectors are used to illustrate the various components of the segment profile vector, such as category, source, and duration. A sample correlation equation is also illustrated, consisting of the well-known inner (or dot) product of the various bra and ket vector components. Other types of correlation techniques can be utilized including, but not limited to, statistical measures of similarity, weighted matching of components, and other calculations, derivations, and mathematical operations that provide a measure of the mutual relation between the subscriber and content profiles. FIG. 9B provides examples of contextual detail for the contents of each of the vector components, using the bra vectors as an illustrative example. The category component, for example, may have a value—possibly one or more Boolean values—indicating that news or world news is preferred by a given subscriber, but the subscriber does not wish to view non-local news. The exemplary source vector indicates that the subscriber prefers to receive her news from the BBC or the New York Times, but not CNN or FOX. Lastly, the duration vector provides a range of time, in this case at least 60 seconds but not longer than 3 minutes, for which the aggregated program should run.

Figure 10:
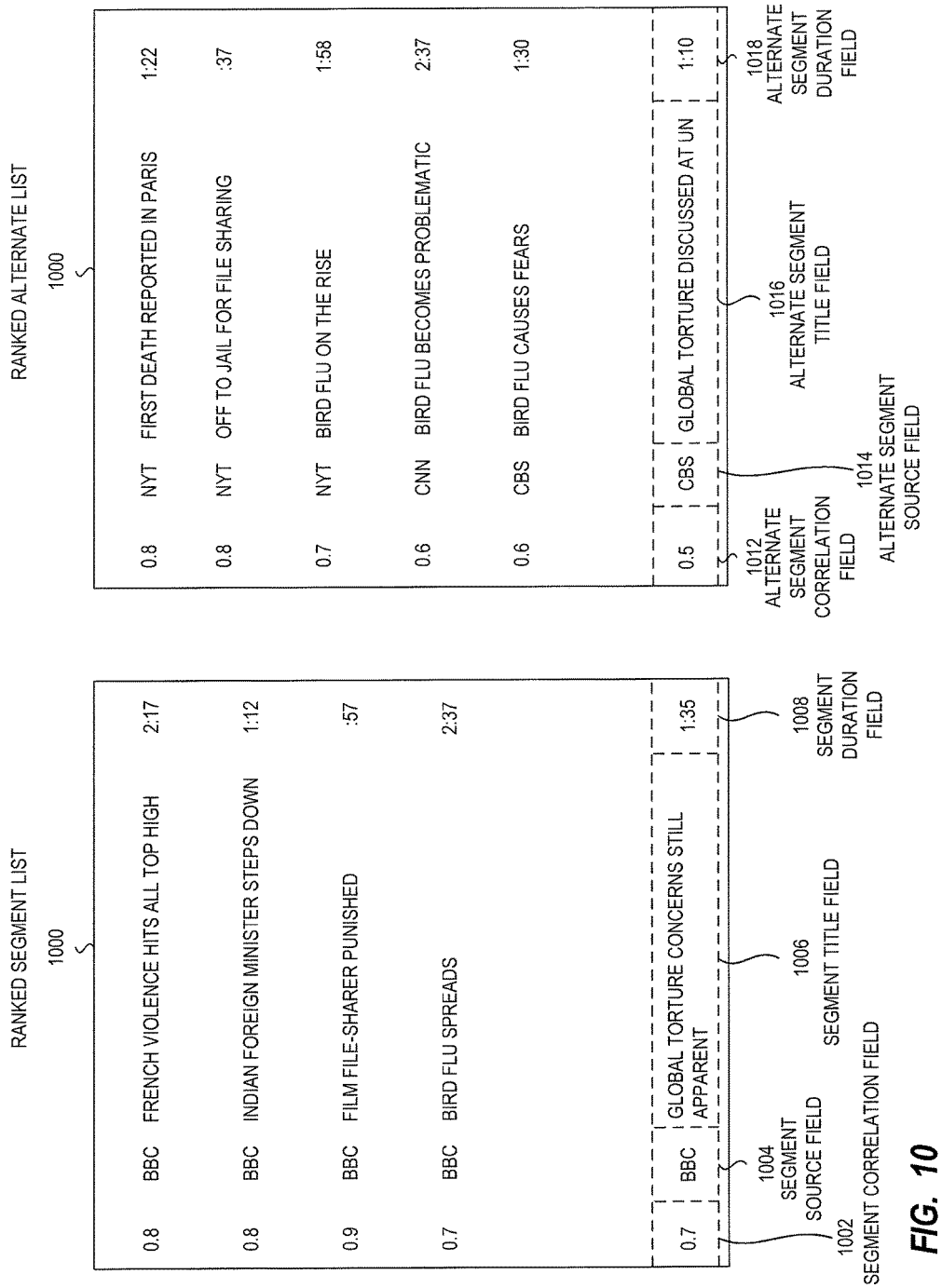
FIG. 10 illustrates a ranked segment list and a ranked alternate list in accordance with one embodiment of the present invention.

FIG. 10 illustrates a possible result of the correlation procedure carried out by TCM 610 on the bra-ket vectors of FIG. 9. In one embodiment, two separate ranked lists of video segments are created, one primary list and one alternate list. Ranked segment list 1000 contains an array of video segment records, with each record containing fields that capture pertinent information about the preferred video segments. Such fields include the segment correlation field 1002, which provides the raw score of the correlation equation from FIG. 9B (e.g., the dot or inner product of the bra and ket vectors). The segment source field 1004 contains information regarding the author, owner, producer, or source of the video segment, such as the BBC, CNN, or The New York Times. The segment title field 1006 contains the segment's title, and the segment duration field 1008 contains the segment's duration in time units. In one embodiment, a ranked alternate list 1010 is also created by the correlation procedure. Ranked alternate list 1010 contains corresponding records similar to those of the primary ranked segment list 1000, such as alternate segment correlation field 1012, alternate segment source field 1014, alternate segment title field 1016, and alternate segment duration field 1018.

Ranked alternate list 1010 is generated from items that generally correlate with the subscriber content profile vector 900, but that may generally be less correlated than those items on the ranked segment list 1000. For example, items on alternate list 1010 may not come from the preferred sources and are therefore considered "second choices" although they may be of more appropriate time duration and may be substituted in, as will be subsequently discussed.

Figure 11:
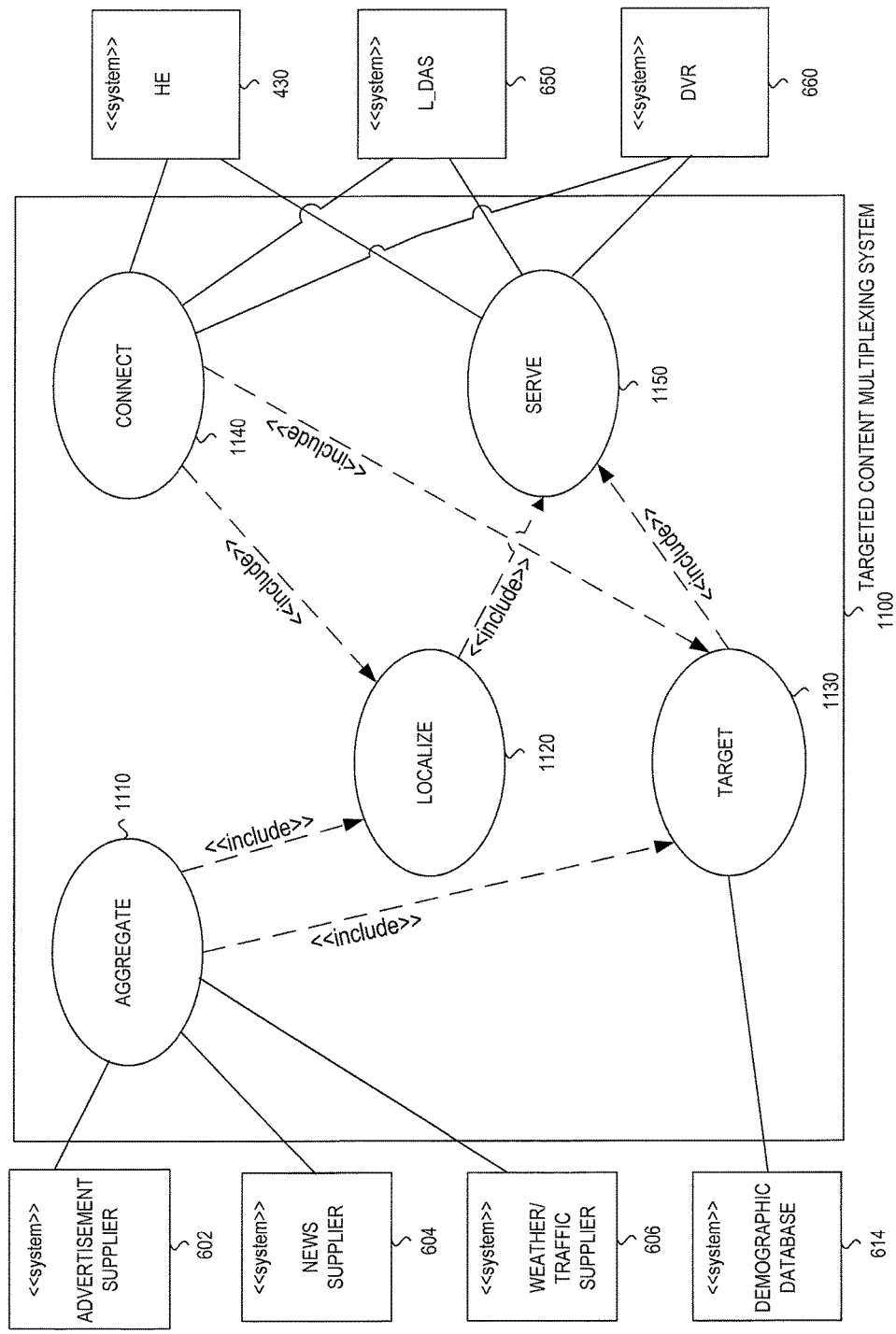
FIG. 11 is a use-case diagram of a targeted content multiplexing system in accordance with one embodiment of the present invention.

FIG. 11 is a UML use case diagram of the targeted content multiplexing (TCM) system 1100 in accordance with one embodiment of the present method and system. The TCM 1100 system receives video content, via the aggregate use case 1110, from various provider systems, including, but not limited to, advertisement supplier system 602, news supplier system 604, and weather/traffic supplier system 606. Aggregate use case 1110 combines this content, according to the procedures discussed above, and provides the results to the localize use case 1120 and the target use case 1130. Target use case 1130 also receives demographic data from demographic database system 614. Using the connect use case 1140 and the serve use case 1150, the TCM system 1100, interacts with a plurality of external systems, including, the cable head-end system 430, the L_DAS system 650, and one or more residential digital video recorder systems 660. Connect case 1140 provides means with which these external systems may connect with the TCM system 1100, such means being well-known to those of ordinary skill in the art, including, for example, the Internet, LAN, and wireless connection. Additionally, serve use case 1150 provides the targeted multiplexed content created by the TCM system 1100 to these external systems, also by means well known in the art.

Figure 12:
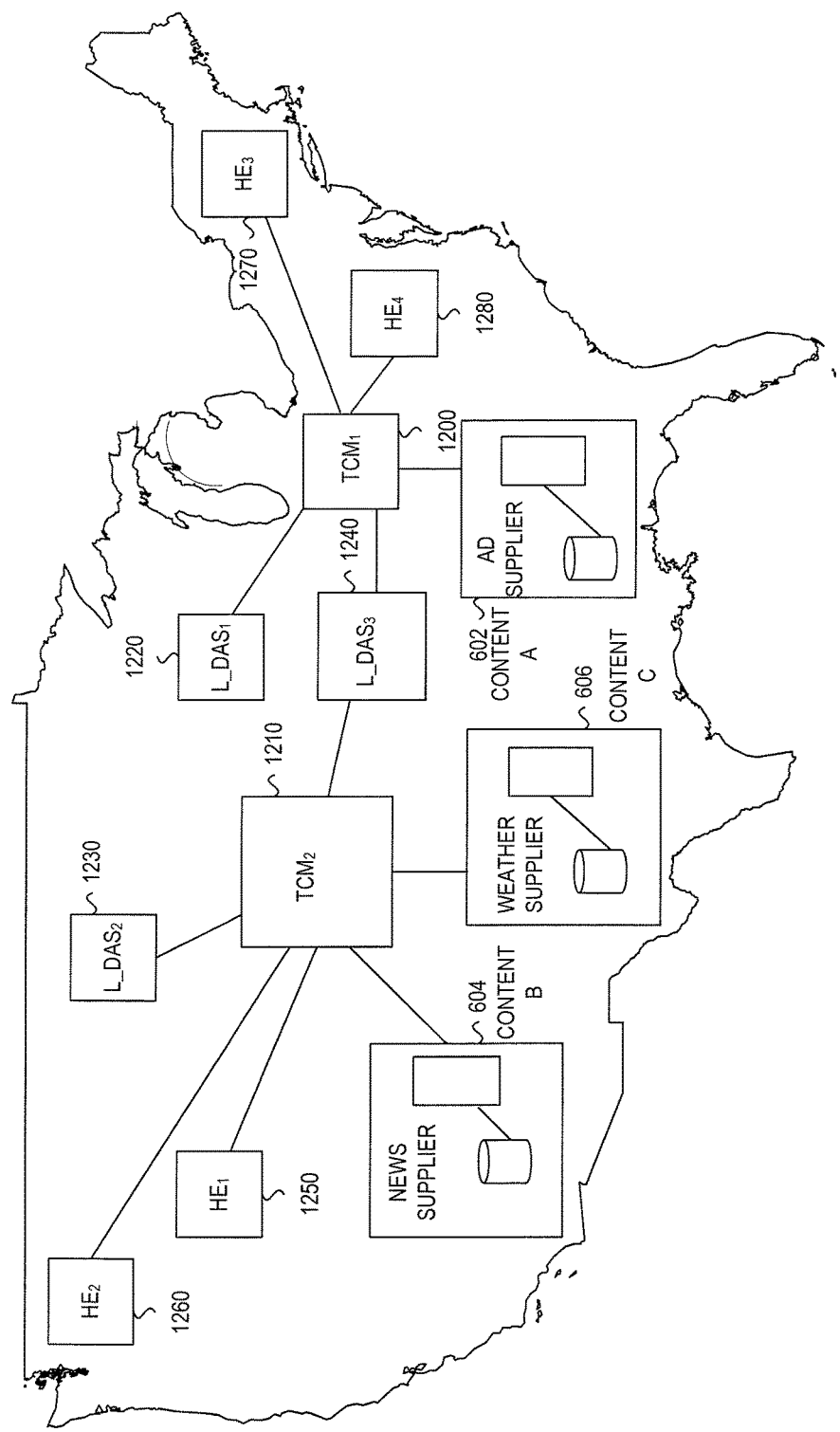
FIG. 12 illustrates a system for assembly and distribution of targeted multiplexed content to a plurality of receivers in accordance with one embodiment of the present invention.

FIG. 12 illustrates a representative geographic architecture for the distribution of targeted multiplexed content. The representative system contains two separate Targeted Content Multiplexing systems: TCM1 1200 and TCM2 1210. Both of the TCM systems 1200, 1210 are connected to one or more Local Demographic Aggregation Servers and one or more cable head-ends. TCM1 1200, for example, is connected to cable head-ends HE3 1270 and HE4 1280, along with Local Demographic Aggregation Servers L_DAS1 1220 and L_DAS3 1240. Similarly, TCM2 1210 is connected to head-ends HE1 1250 and HE2 1260 and to Local Demographic Aggregation Servers L_DAS2 1230 and L_DAS3 1240. It should be noted that a given Local Demographic Aggregation Server may be connected to more than one targeted content multiplexer systems in order to collect a greater variety of content. L_DAS3 1240, for example, is connected to both TCM1 1200 and TCM2 1210. Also within the network are various content suppliers, such as advertisement supplier 602, which is connected to TCM1 1200; news supplier 604, which is connected to TCM2 1210; and weather supplier 606, which is connected to TCM2 1210.

In one embodiment, multiple TCMs, such as TCM1 1200 and TCM2 1210, are served by one or more content suppliers, thus alleviating the need for one TCM to access another TCM for content. Alternatively, a TCM may be able to gather content delivered from a content provider and simultaneously from another TCM, in order to supply a broader range of content.

Figure 13:
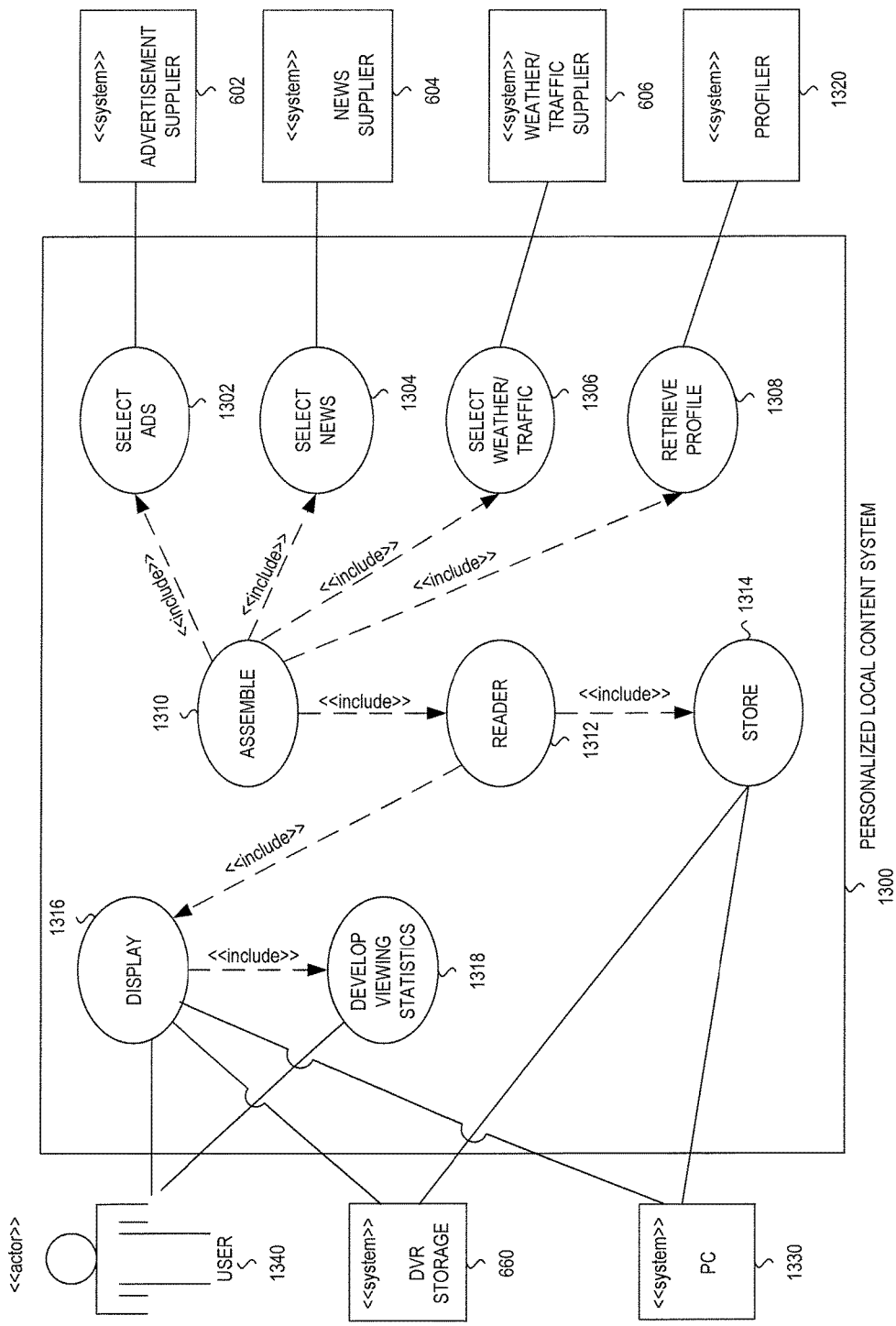
FIG. 13 is a use-case diagram for a personalized local content system in accordance with one embodiment of the present invention.

FIG. 13 is a use case diagram for a personalized local content system 1300 in accordance with one embodiment of the present method and system. As with targeted content multiplexing system 1100, personalized local content system 1300 interacts with several external systems, including advertisement supplier 602, news supplier 604, and weather/traffic supplier 606, in substantially the same fashion as described with respect to the TCM system 1100. That is, each of these external systems supplies their specified content to the personalized local content system 1300 via corresponding selector use cases, specifically, select ads use case 1302, select news use case 1304, and select weather/traffic use case 1306, respectively, in response to select signals sent from the respective selector use cases. Additionally, personalized local content system 1300 interacts with external profiler 1320 via retrieve profile use case 1308. Profiler 1320 provides demographic profiles for various users of the personalized local content system 1300.

Once the various contents have been supplied by the external systems, personalized local content system 1300 assembles, renders, stores and displays the content. Assemble use case 1310, render use case 1312, store use case 1314, and display use case 1316 address these functions for the personalized local content system 1300. A display use case 1316 accesses the outputs of both the render use case 1312 and the store use case 1314 to create a display that the user 1340, external to personalized local content system 1300, can access, view, and comprehend. Additionally, display use case 1316 can provide content suitable for digital video recorder system 660 or a personal computer system 1330, also both external to personalized local content system 1300, preferably located at the residence or workplace of user 1340.

Figure 14A:
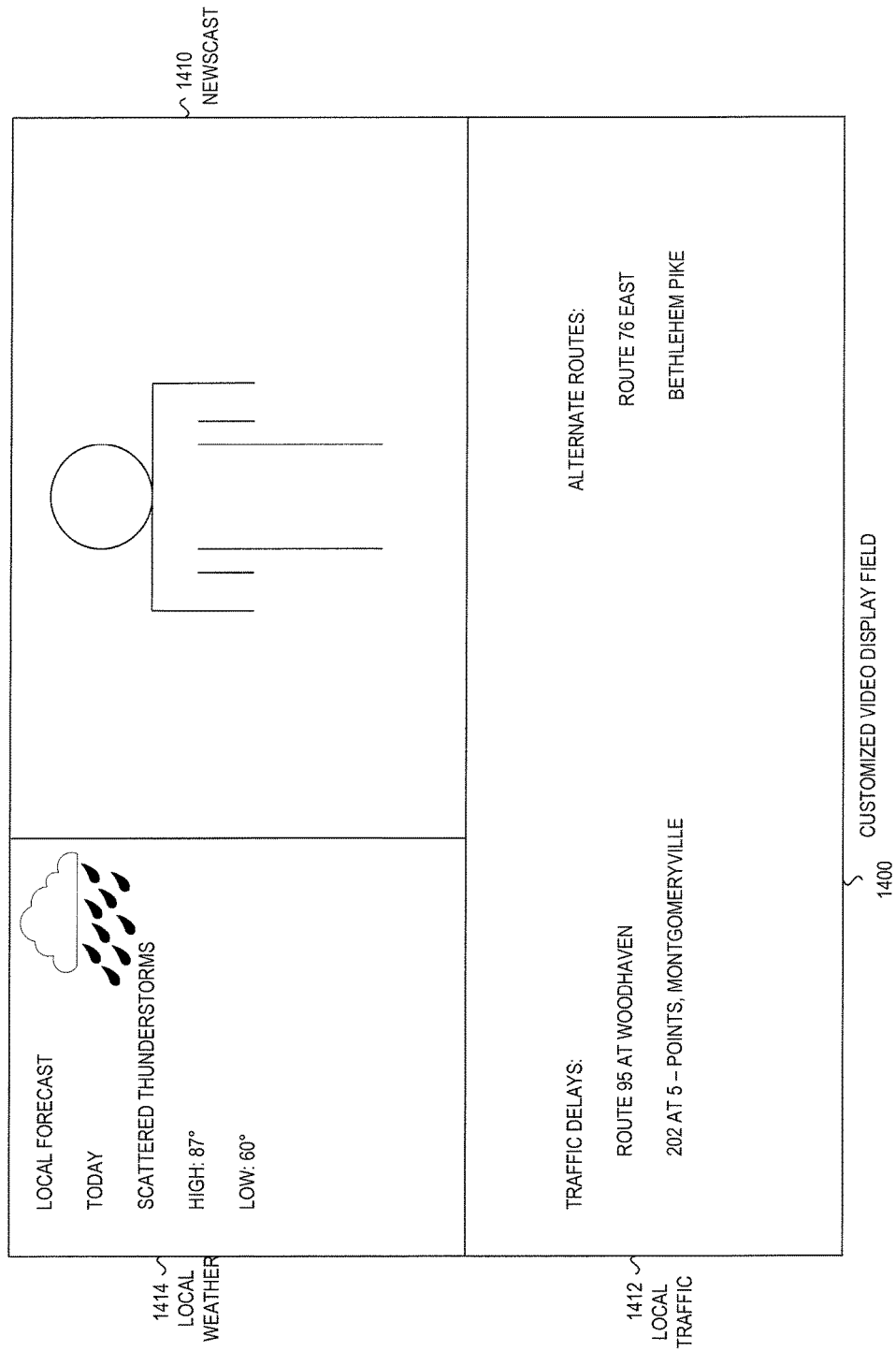
FIG. 14A illustrates an example of a display of a newscast having motion video and overlay text and graphics related to stocks and travel related weather in accordance with one embodiment of the present invention.

FIG. 14A provides a graphical illustration of one possible customized video display field 1400 suitable for display on a television set, computer monitor, or other standard display device, such as a portable MPEG player. Presented is a standard L-shaped display, in which, for example, newscast 1410 occupies the central display region, local traffic display 1412 occupies the bottom display region, and a local weather report 1414 occupies the side display region.

As is commonly understood, rendering technology combines video and audio with any applied effects, such as transitions or filters, one frame at a time. Once rendered, a sequence can be played in real time. Rasterizing technology converts a vector image or an object-oriented image into a bit-mapped image. Once rasterized, the graphics image, digital image, or bitmap is converted into a rectangular grid of pixels on a computer monitor (and also on paper or other display device).

Figure 14B:
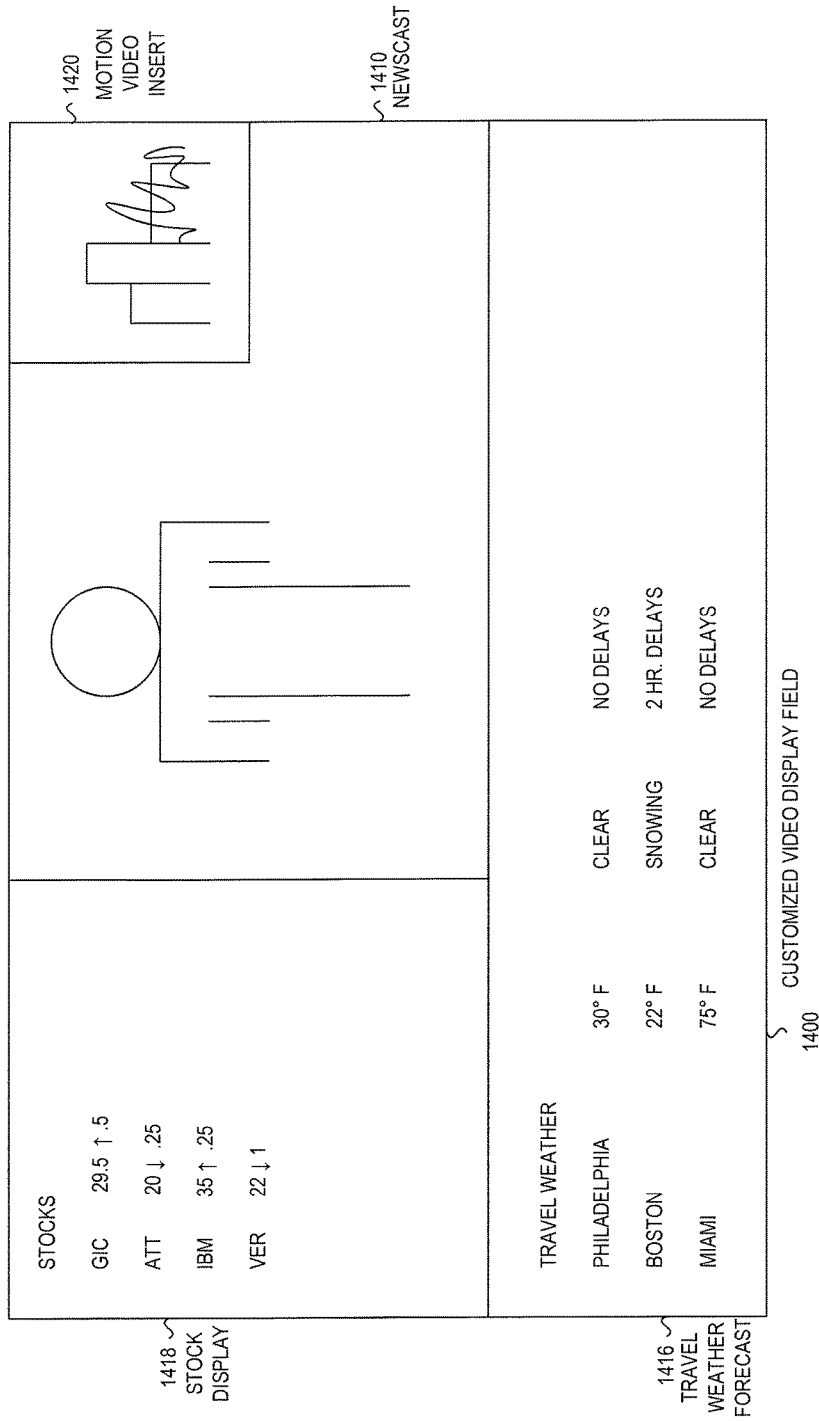
FIG. 14B. illustrates an example of a display of a newscast having an overlay of local weather and traffic in accordance with one embodiment of the present invention.

FIG. 14B provides an alternative graphical illustration of another possible customized video display field 1400. In this embodiment employing a modified L-shaped display, a newscast 1410 similarly occupies the central display region, a travel weather display 1416 occupies the bottom display region, and a stock listing (or ticker) 1418 occupies the side region display region of the standard L-shaped display arrangement. Additionally, motion video insert 1420 occupies the upper corner opposite the stock listing 1418.

Figure 14C:
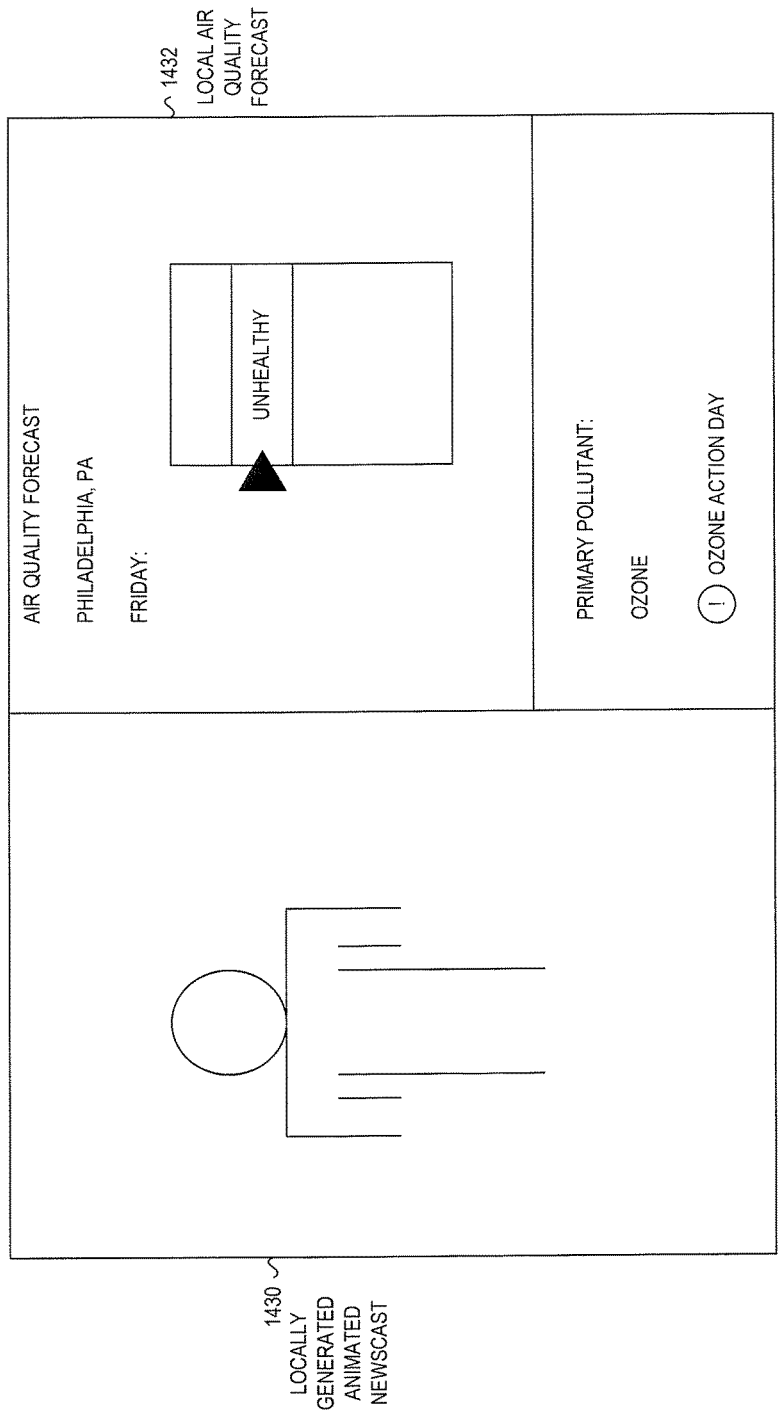
FIG. 14C illustrates an example of a display of a locally generated animated newscast having adjacent graphical/textual content in accordance with one embodiment of the present invention.

While L-shaped display regions are well-known in the art and highly effective for displaying multiple sources of information simultaneously, the present method and system permit user-defined regions for display in customized video programming. For example, FIG. 14C provides an alternative graphical illustration of another possible user-defined customized video display field 1400. In this embodiment, a vertical split-screen arrangement is presented. On the left-hand side of the screen a locally generated animated newscast 1430 is displayed, and on the left-hand side local content, such as a local air quality forecast 1432 is displayed. Locally generated animated newscast 1430 differs from the traditional newscast 1410, in that animated newscast 1430 originates from a text news story, such as would be found in a newspaper, magazine, or Internet article.

It should be noted that the above-referenced output formats are exemplary only, and that additional user-defined output formats are well known to those skilled in the art. Generally, however, in the present method and system the greatest practicable flexibility is provided to the user in creating user-defined output formats. Such flexibility can be seen in, for example, the following general categories of output formats: (i) one-to-one assignments for each of the at least one broadcast signals, and for each of the at least one data streams, to each of the distinct regions of an L-shaped video output format; (ii) one-to-one assignments for each of the at least one broadcast signals and for each of the at least one data streams to each of the distinct display windows of a standard multi-part video display with a plurality of display windows defined by the client; (iii) information for defining the boundaries of each of a plurality of display windows of a multi-part video display; (iv) a selection for an audio component chosen from one of the at least one broadcast signals or from one of the at least one data streams from a communications network; and (v) a ready-to-display output format that is implied by the nature of the at least one broadcast signals or the at least one data streams to be displayed, and is therefore not included in the unified transmission to the user, but instead generated at the user site.

Figure 14D:
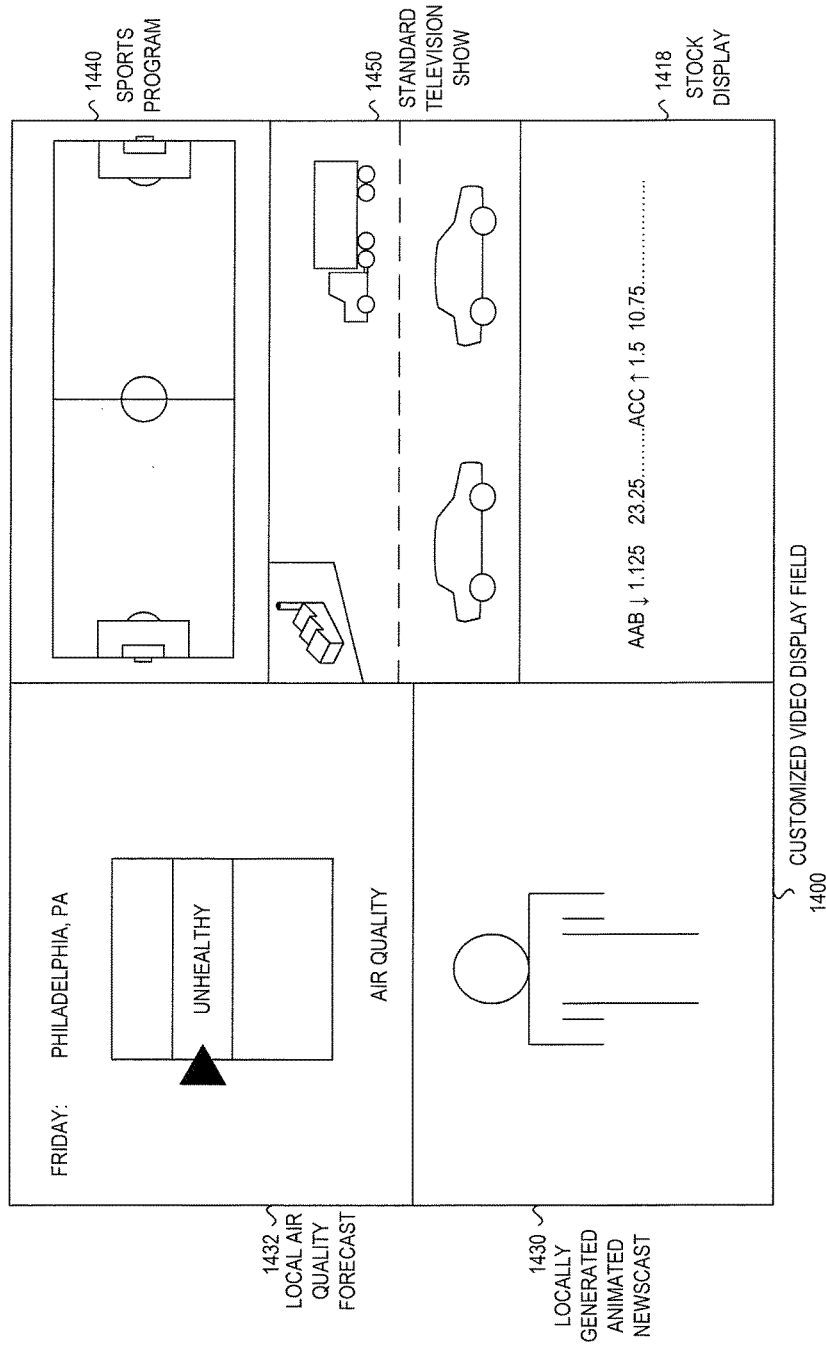
FIG. 14D illustrates an example of a customized video display having a local news broadcast, a local air quality forecast, a sports program, a one-hour drama, and a stock data crawl in accordance with one embodiment of the present invention.
Figure 14E:
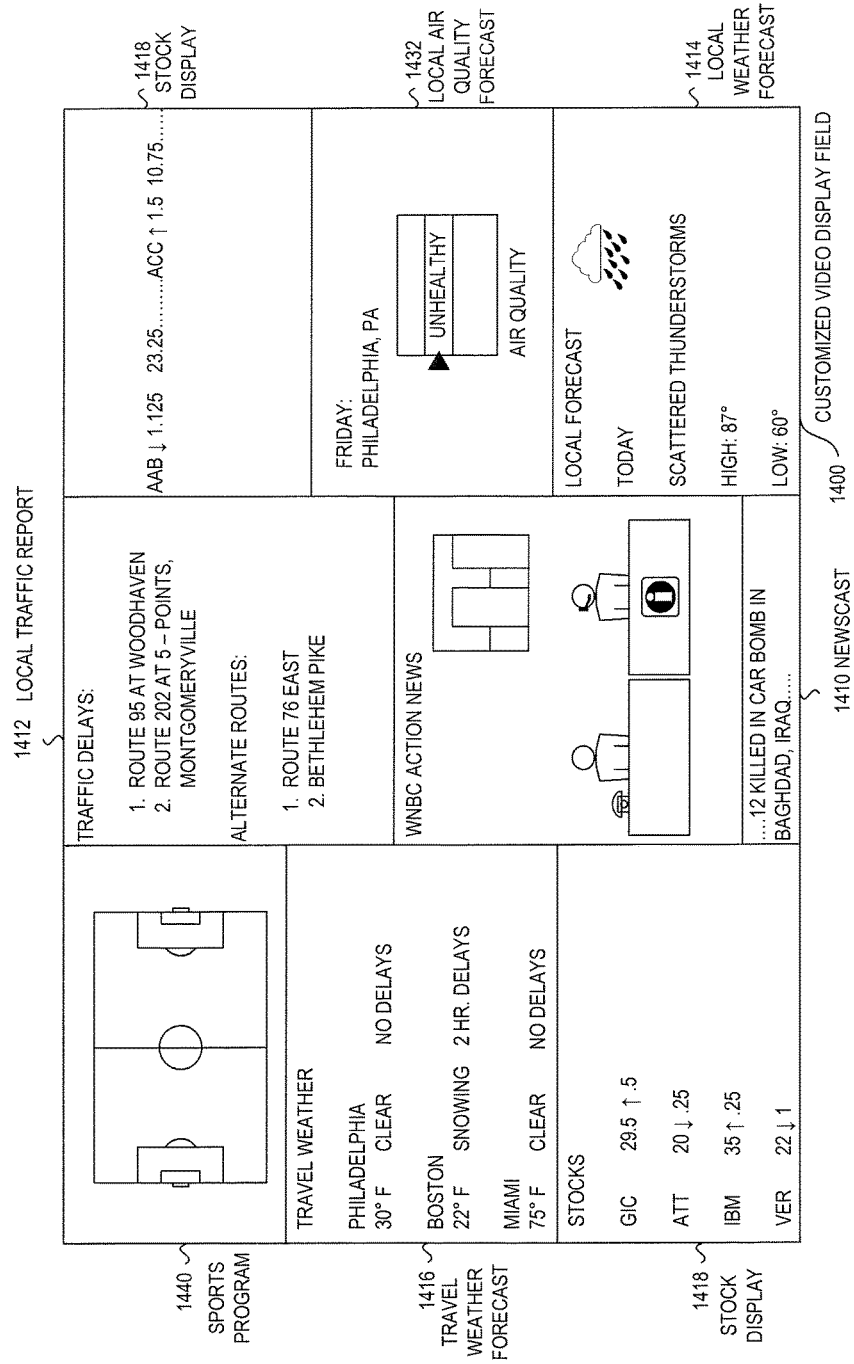
FIG. 14E illustrates an example of a customized video display having a local news broadcast, a local traffic data report, a sports program, a travel weather forecast, a stock ticker, a stock data crawl, a local air quality forecast, and a local weather forecast in accordance with one embodiment of the present invention.

While customary video displays, such as the L-shaped display of FIGS. 14A, 14B, and 14C may be popular, and to some degree of greater utilitarian value, the present method and system is capable, in one or more embodiments, of creating unusual hybrid video display formats that are user-defined. FIGS. 14D and 14E, for example, illustrate two possible combinations of display formats and content assignments. In FIG. 14D, the standard video display region is divided in half vertically. The left-most vertical region is then divided in half horizontally again. The right-most vertical region is then divided into three distinct regions by horizontal division. In the resulting five regions, different content is assigned. The lower left region, as illustrated, shows a locally generated animated news program 1430. The upper left region shows a local air quality forecast 1432. The upper right region displays a sports program 1440, such as a professional football, basketball, baseball, hockey, or soccer game. The lower right region displays a stock ticker 1418. The middle right region provides a standard television program 1450, such as a situation comedy, a one-hour drama, or other content one would typically find on a broadcast or cable television station.

FIG. 14E provides another illustration of the variety ways in which the standard video display region may be divided to create a customized video display field 1400. In FIG. 14E, the standard video display region is divided into three vertical regions. The left-most and right-most vertical regions are again divided into three horizontal regions each. The central vertical region is also divided in half horizontally, to provide a total of eight distinct regions. The central vertical region is provided with a local newscast 1410 in the lower region, and a local traffic report 1412 in the upper region. The left-most vertical region displays a sports program 1440, a travel weather forecast 1416, and a stock display 1418 in its three regions, respectively, from top to bottom. The right-most vertical region displays a stock ticker 1418, a local air quality forecast 1432, and a local weather forecast 1414 in its three regions, respectively, from top to bottom.

Locally generated animated newscast 1430 can be created by accessing news content from any of the information sources discussed herein, including, but not limited to, cable television, broadcast television, or the Internet. When the news content is provided in text form only, as is often the case with print news media published on the Internet, the present system and method and apparatus can transform the text-only content into a multimedia animated broadcast. Voice synthesizing technology, as is well understood by those of ordinary skill in the art, is used to convert the text-only content into an audio stream, such that a computer synthesized human voice is heard to be reading the text-only content. Additionally, in one embodiment, computer avatar technology, such as that produced by Televirtual Ltd., is used to provide a virtual, animated human or humanoid figure to accompany the voice synthesized audio content. In this fashion, text-only content retrieved from whatever source can be converted into a programming stream with both audio and video components.

FIGS. 15A-15E provide illustrated details of one possible embodiment of a GUI for receiving user-defined parameters to customize a video display, via the personalized content manager 1700. As illustrated, personal content manager 1700 can be a familiar Windows-based options screen with several tabs to keep distinct categories of display parameters organized. The illustrated embodiment provides a general tab 1710, a news tab 1730, a weather tab 1750, a traffic tab 1770, and a sports tab 1790. Other tabs (not shown), relating to specific categories of viewing content, are also possible, including but not limited to a business tab, a sit-coms tab, a drama tab, a lifestyles show tab, and a documentary tab, etc.

Within the general tab 1710, several parameter options may be provided. For example, the illustrated embodiment provides a desired program length drop-box 1712, such that program lengths may be specified in prescribed increments over a given continuum of durations. Optionally, a maximum program length option 1714 is provided, through which the user may provide an absolute limit on the desired program's duration. A prepare-by option 1716 is also preferably provided, which accepts a deadline for preparation of the program from the user. Additionally, several categories of programming content are accepted as input, via user-accessible input fields, (e.g., drop-boxes, pull-down menus, etc.) corresponding to first category 1718, second category 1720, third category 1722, fourth category 1724, and fifth category 1726. Additional categories of programming content may be added in other embodiments. For example in FIG. 15A, each of the prioritized category fields, 1718, 1720, 1722, 1724, 1726, 1728 allows the user to select from a predefined content category (e.g., news, weather, traffic, sports, and movies) and, optionally, a time duration. From these prioritized categories, personalized local content system 1300 selects the specified content and assembles a customized program stream according to the parameters received from user 1340. In one embodiment, the parameters received from the user 1340 can be selected via a pull-down menu of pre-defined choices.

Figure 15A:
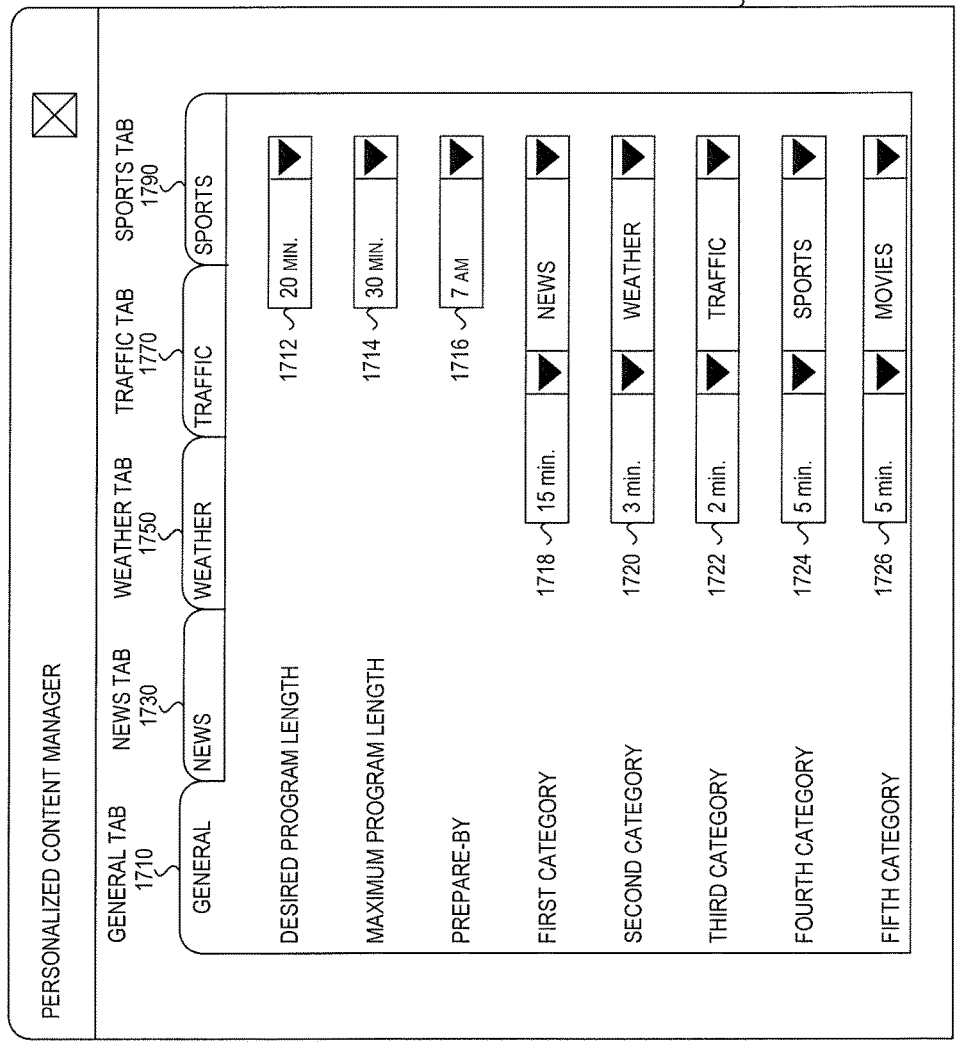
FIG. 15A illustrates an exemplary view of a general settings tab in a personalized program manager Graphical User Interface (GUI) in accordance with one embodiment of the present invention.
Figure 15B:
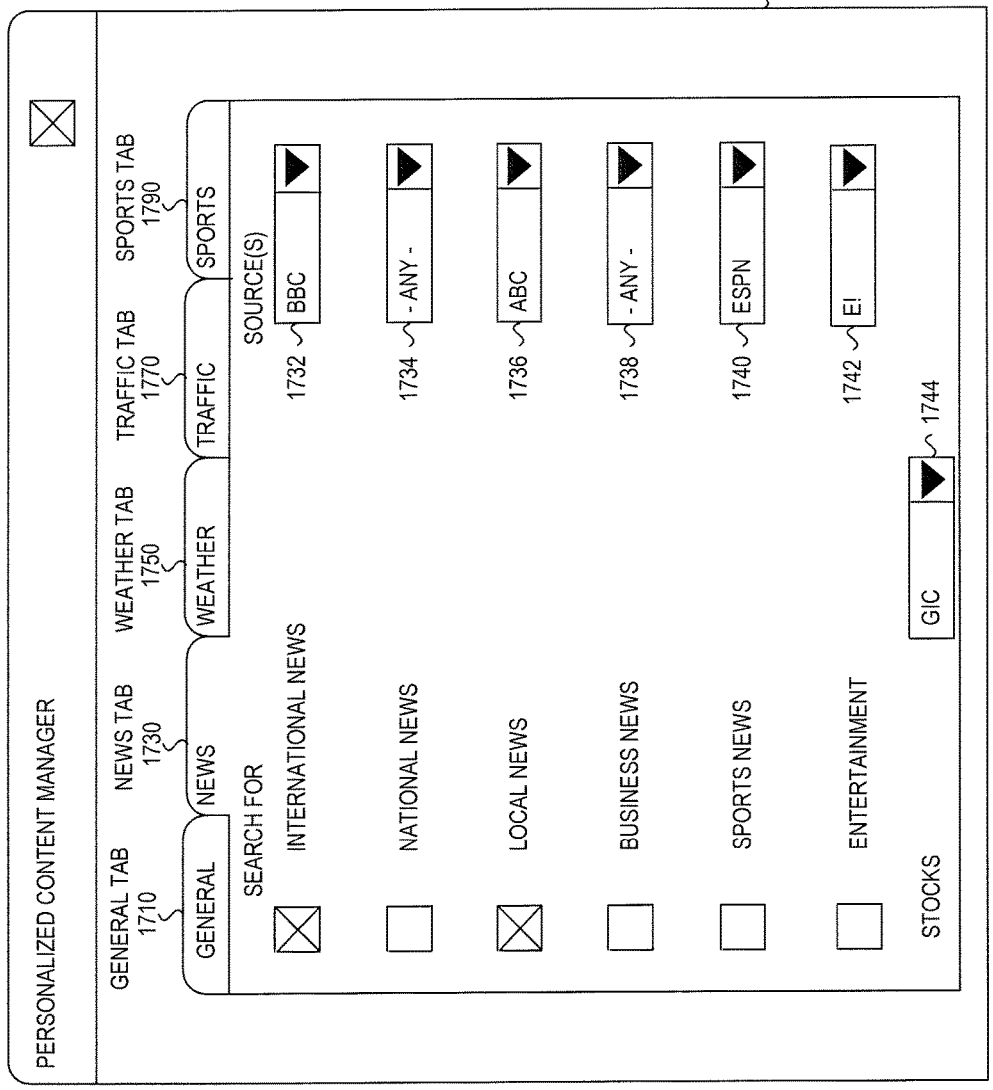
FIG. 15B illustrates an exemplary view of a news settings tab in a personalized program manager GUI in accordance with one embodiment of the present invention.

FIG. 15B illustrates details of the news tab 1730. News tab 1730 permits user 1340 to designate one or more categories of news to be included in the customized programming stream, and within each category, news tab 1730 permits user 1340 to designate a specified source for news (e.g., a specific network, magazine, newspaper, or website) within each category selected. Combinations of news sources may also be selected. News categories can be taken from user-accessible input fields, including international news option 1732, national news option 1734, local news option 1736, business news option 1738, sports news option 1740, and entertainment news option 1742. Other categories of news are also contemplated by the present method and system, and can be extended in accordance with knowledge generally available to one of ordinary skill in the art. Additionally, a user-accessible input field may be provided. For example, stock ticker option 1744 may be utilized to receive stock symbols for incorporation into various stock data displays, including stock display 1418 from FIG. 14B.

Figure 15C:
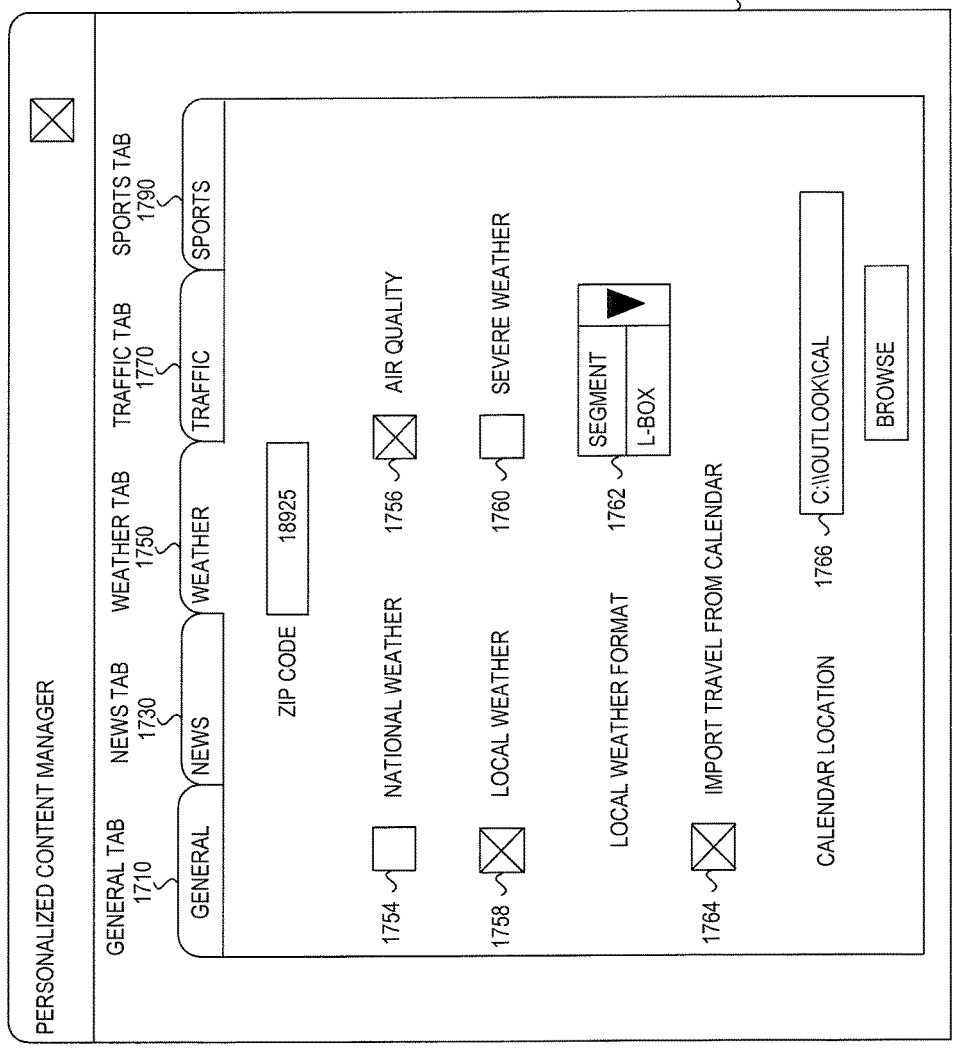
FIG. 15C illustrates an exemplary view of a weather settings tab in a personalized program manager GUI in accordance with one embodiment of the present invention.

FIG. 15C provides illustrated details of weather tab 1750. User-accessible input fields are provided to select both a location (i.e., zip code field 1752) and specific weather content, such as national weather field 1754, air quality field 1756, local weather field 1758, and severe weather field 1760. Display parameters for local weather option 1758 are also provided in the form of local weather format field 1762, in which a variety of display options are provided in a pull-down menu. A further option is illustrated in which travel information may be imported from a user's calendar software for the creation of a travel weather display, such as travel weather forecast 1416, via the user-accessible import-travel-from-calendar option 1764. Means are also provided in which the user 1340 may specify the location of his or her calendar files, via calendar location field 1766.

The present system and method has the capability of accessing a user's scheduling software, whether stored on a personal computer, hand-held device, server, public or private network, or the Internet. Once the scheduling software is accessed, the system and method can identify the user's travel itinerary—regardless of mode of transportation (e.g., air travel, train, car, bus, etc.)—and then access programming content pertinent to the locations revealed by the itinerary. "Locations" as used herein, and in the claims, refers to destinations, return locations, layovers, rest stops, or other places in which the user's travel may take them. Another embodiment of the present system and method localizes, specifically, news, weather, and traffic data according to the scheduling software. Scheduling software may include the commercially available program offered by the Microsoft Corporation under the trademark Outlook, or it may include other software packages by different manufacturers that accomplish the same basic tasks of tracking a user's personal data, including travel data.

Figure 15D:
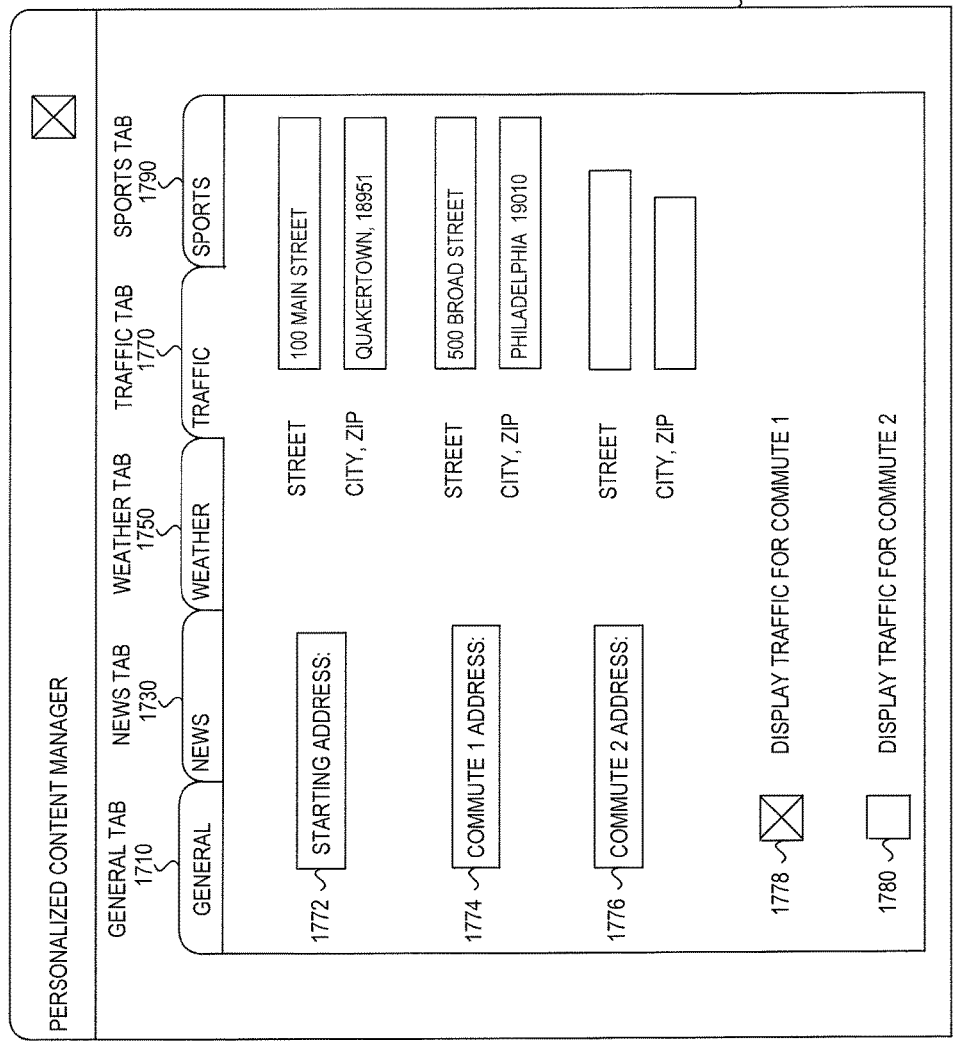
FIG. 15D illustrates an exemplary view of a traffic settings tab in a personalized program manager GUI in accordance with one embodiment of the present invention.

FIG. 15D illustrates details of traffic tab 1770. A user-accessible input field, starting address field 1772, is provided into which user 1340 may enter a starting address for traffic information related to one or more commuting routes. Destination addresses for one or more commuting routes may be input via commute 1 address field 1774 and commute 2 address field 1776. In other embodiments, additional addresses may be provided to the system to serve as either starting locations or destinations. Click-boxes (display option for commute 1 address 1778 and display option for commute 2 address 1780) are also provided for user 1340 to toggle-enable the display of traffic information for each of the destination addresses specified. Other embodiments can make use of widely known traffic routing software to suggest alternate routes depending upon the current traffic conditions.

Figure 15E:
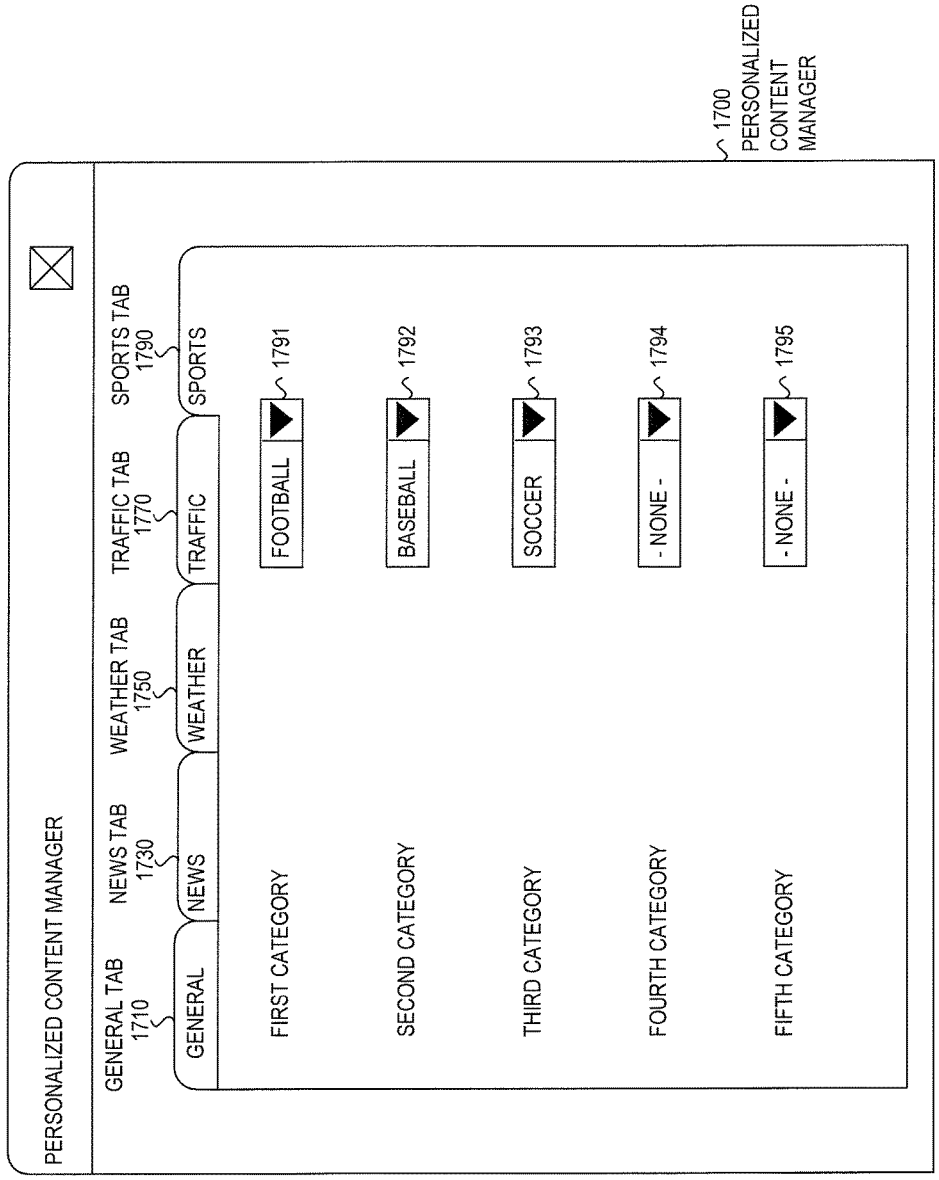
FIG. 15E illustrates an exemplary view of a sports settings tab in a personalized program manager GUI in accordance with one embodiment of the present invention.

FIG. 15E illustrates details of sports tab 1790. Sports tab 1790 provides options for user 1340 to specify the categories of sports news in a prioritized list, via first sports news category 1791, second sports news category 1792, third sports news category 1793, fourth sports news category 1794, and fifth sports news category 1795. In one embodiment, illustrated, within each category, drop-down boxes are provided from which user 1340 may select pre-defined sports categories from which news stories will be selected.

Figure 16:
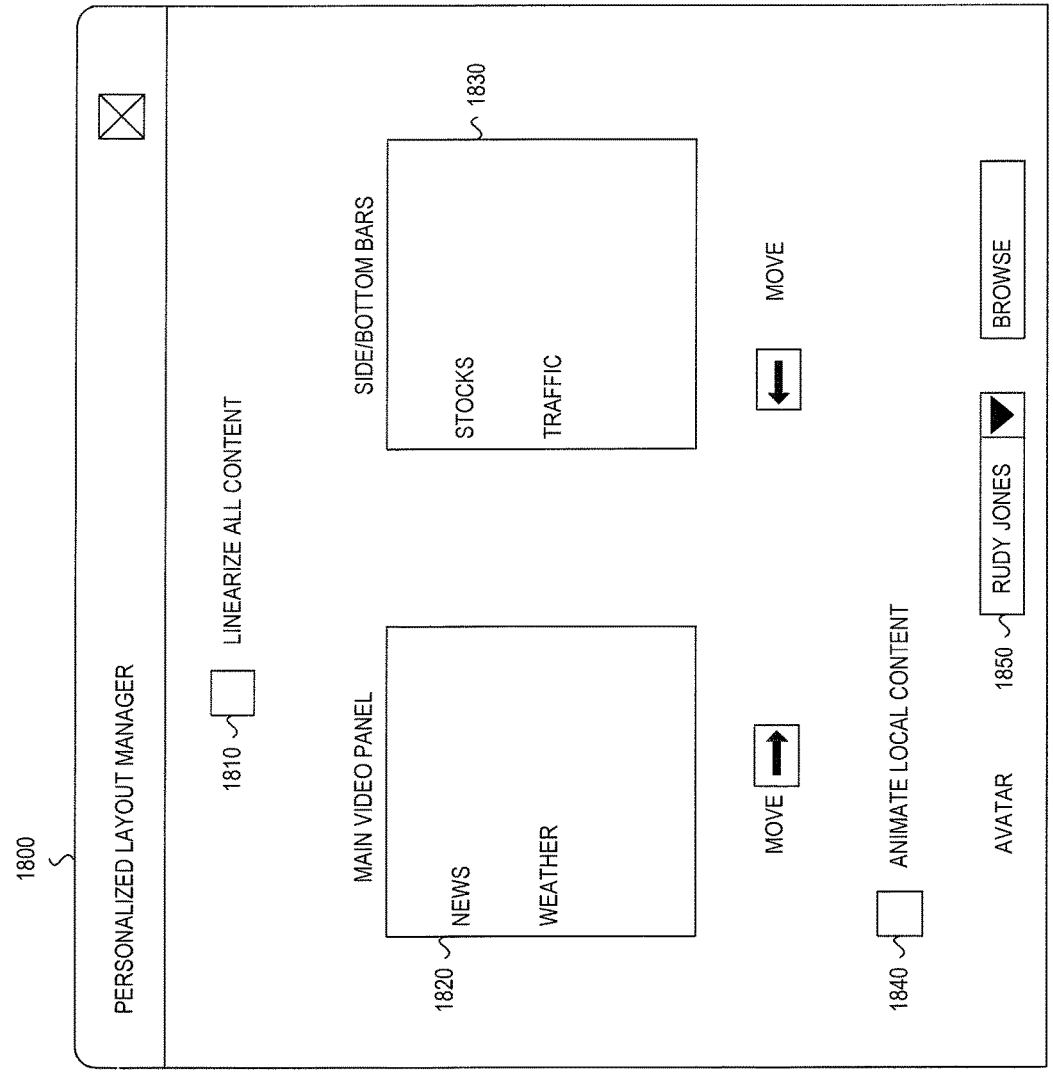
FIG. 16 illustrates an exemplary view for a personalized layout manager GUI in accordance with one embodiment of the present invention.

FIG. 16 illustrates details for the personalized layout manager 1800 of the GUI. Personalized layout manager 1800 provides the ability for personalized local content system 1300 to obtain parameters from user 1340 regarding how to create separate display fields on a television or monitor screen and how to assign specific content to each display field. The embodiment of FIG. 16, includes a linearize-all-content option 1810, in which user 1340 may specify that all content be displayed in a full-screen format in a linear time sequence, as is the case with most ordinary television programming. If linearize-all-content option 1810 is not selected, main video panel display content options text-box 1820 and side/bottom bar display content options text-box 1830, are enabled for user input. The text boxes 1820, 1830 permit the user 1340 to assign specific content to the various display panels as indicated. Main-side-bottom display option-control buttons 1860 are also provided to manage the content of the text boxes. An animate-local-content option box 1840, is provided so that the user 1340 may specify whether he or she desires to have local content animated into a display, such as for locally generated animated newscast 1430, using an avatar. If animate-local-content option 1840 is selected, avatar selection field 1850 is enabled so that user 1340 may select an avatar in accordance with his or her preference, including searching the Internet for additional avatar personalities. It should be noted that the above-referenced user-defined parameters are exemplary only, and that other such parameters generally known to those skilled in the art may be utilized.

Figure 17:
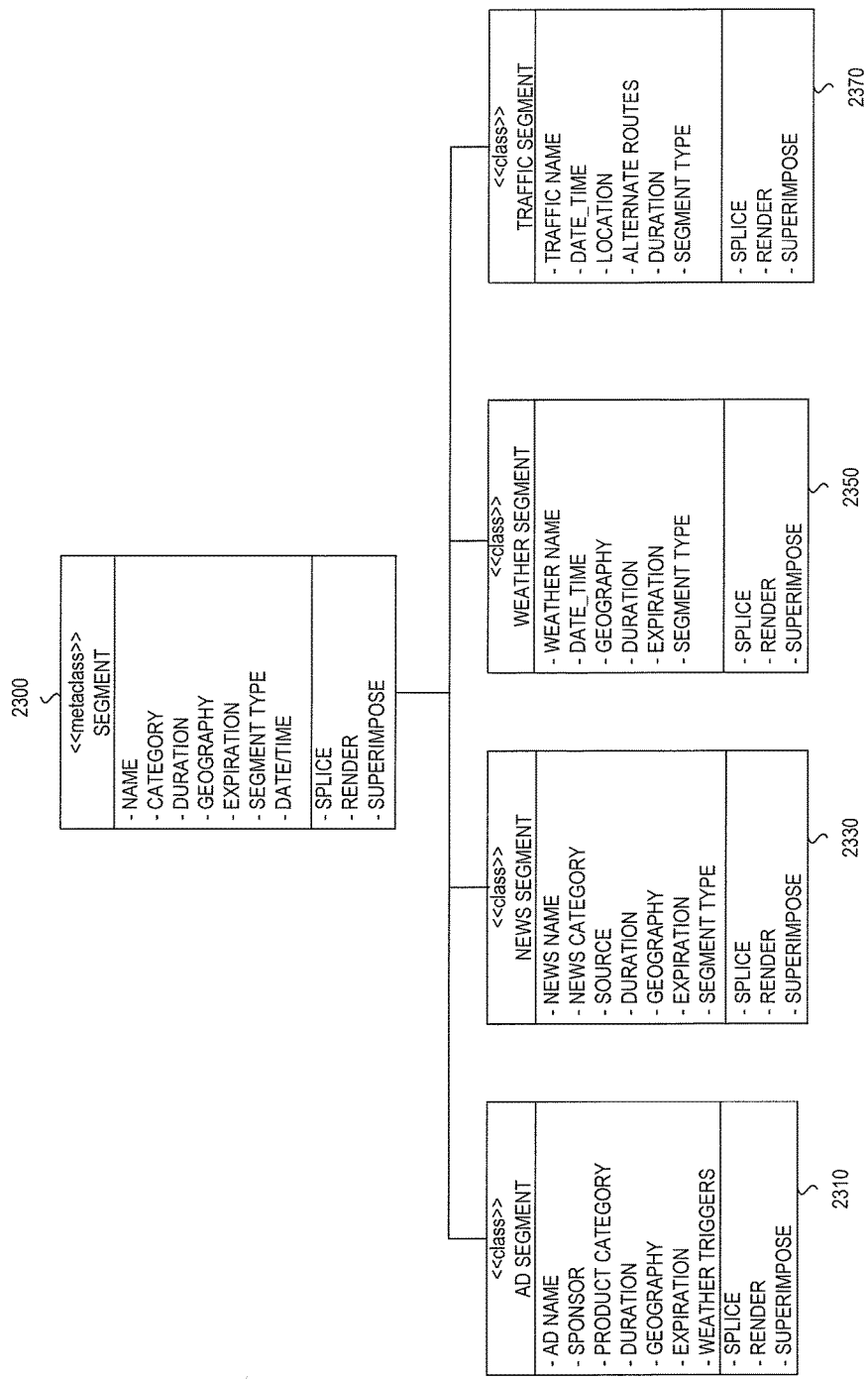
FIG. 17 is a class diagram for video segments in accordance with one embodiment of the present invention.

FIG. 17 provides a class diagram for the data classes associated with the aggregate use case 1110 of the targeted content multiplexing system 1100 (see FIG. 11) and the assemble select ads use case 1302, select news use case 1304, select weather/traffic use case 1306, retrieve profile use case 1308, and assemble use case 1310 of the personalized local content system 1300 (see FIG. 13). Segment metaclass 2300 is the metaclass associated with each of the information segments provided by the external systems, such as advertisement supplier 602, news supplier 604, and weather/traffic supplier 606 associated with the targeted content multiplexing system 1100. Segment metaclass 2300 retains pertinent general information regarding each of the segments which enter systems 1100 or 1300, such as name, category, date and time, duration, geography, expiration, segment type. Segment metaclass 2300 can contain four distinct data classes: advertisement segment class 2310, news segment class 2330, weather segment class 2350, and traffic segment class 2370. Each of these classes corresponds to the segments received from the above-referenced supplier systems. Advertisement segment class 2310 preferably includes data fields useful for the management of advertisement segments, such as advertisement name, sponsor, product category, duration, geography, expiration, weather triggers, and segment type. Similarly, news segment class 2330 preferably includes data fields useful for the management of news segments, such as news name, news category, source, duration, geography, expiration, and segment type. Weather segment class 2350 preferably includes data fields useful for the management of weather segments, such as weather name, date and time, geography, duration, and expiration. Traffic segment class 2370 preferably includes data fields useful for the management of traffic segments, such as traffic name, date and time, location, alternate routes, duration, and segment type. Additionally, segment metaclass 2300, advertisement segment class 2310, news segment class 2330, weather segment class 2350, and traffic segment class 2370 all preferably include various MPEG video descriptors (such as splice, render, or superimpose) used in the aggregation of the programming stream by systems 1100 and 1300.

Figure 18:
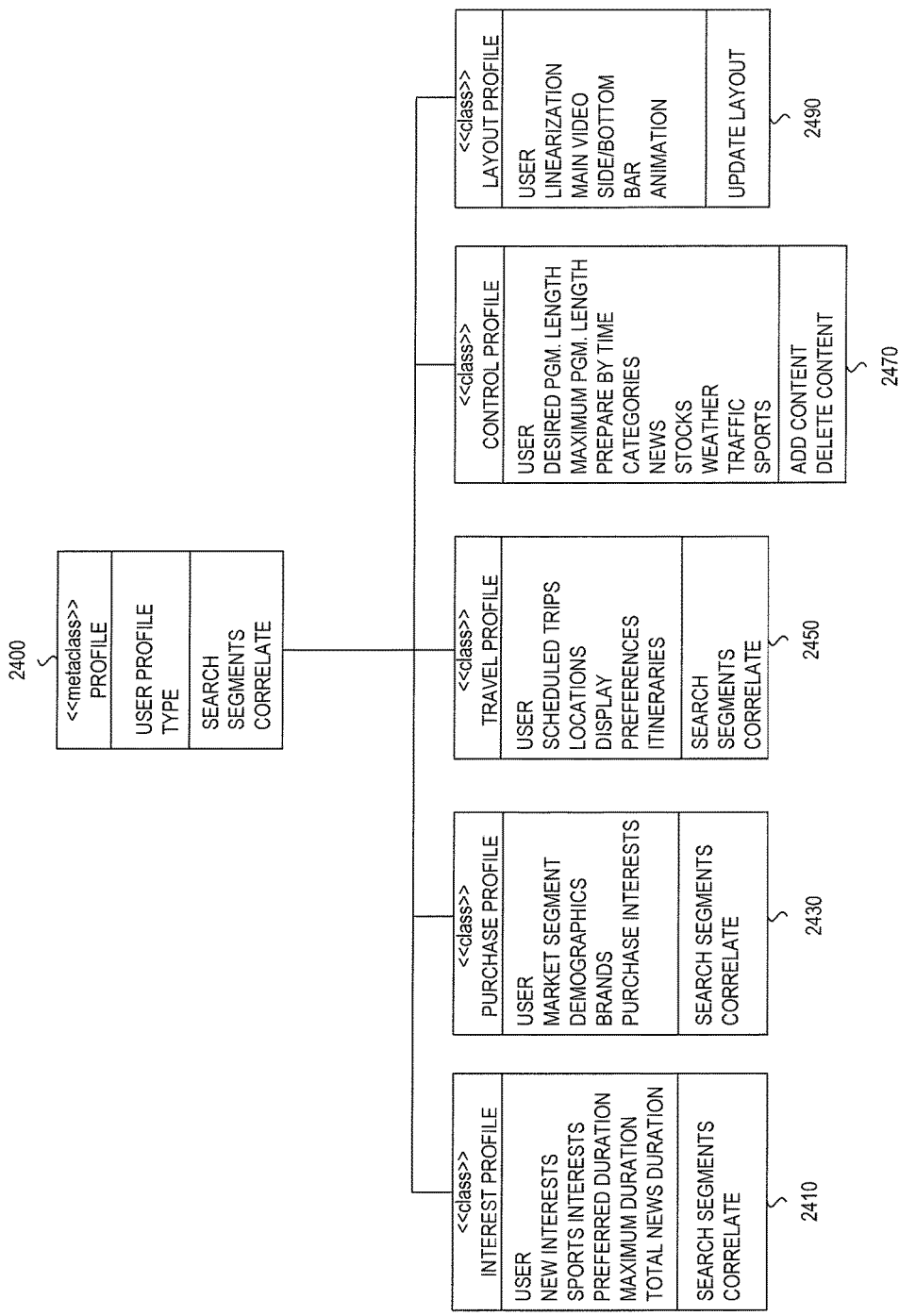
FIG. 18 is a class diagram for user profiles in accordance with one embodiment of the present invention.

FIG. 18 provides a class diagram for the data fields associated with the retrieve profile use case 1308 and assemble use case 1310 of the personalized local content system 1300 (see FIG. 13). Profile metaclass 2400 is the data metaclass associated with various user profiles as provided by external systems, such as profiler system 1320, associated with the personalized local content system 1300. Profile metaclass 2400 contains data fields to identify the user and describe the profile type. Profile metaclass 2400, moreover, preferably includes five distinct data classes: interest profile class 2410, purchase profile class 2430, travel profile class 2450, content profile class 2470, and layout profile class 2490. Interest profile class 2410 preferably includes data fields used to manage a given user's interest profile, such as the user's identification, news interest, sports interests, preferred duration, maximum duration, and total news duration. Purchase profile class 2430 preferably includes data fields used to manage a purchase profile, such as the user's identification, market segment, demographics, brand preferences, and purchase interests. Travel profile class 2450 preferably includes data fields used to manage travel profiles, the user's identification, scheduled trips, locations, display preferences, commute routs, and itineraries. Content profile class 2470 preferably includes data fields used to manage content profiles, such as the user's identification, desired program length, maximum program length, prepared-by time (i.e., the deadline by which the customized program needs to be ready for transmission, viewing, or storage), programming categories, news parameters, stocks parameters, weather parameters, traffic parameters, and sports parameters. Layout profile class 2490 preferably includes data files used to manage layout profiles, such as the user's identification, linearize-all-content options, main video display area content assignments, side and bottom display area content assignments, and animation options. Additionally, profile metaclass 2400, interest profile class 2410, purchase profile class 2430, travel profile class 2450, content profile class 2470, and layout profile class 2490 preferably includes data fields used by assemble use case 1310 of the personalized local content system 1300 for the aggregation of profile-specific information and segments into the aggregated programming stream.

It should be noted that the data fields within interest profile class 2410, purchase profile class 2430, travel profile class 2450, content profile class 2470, and layout profile class 2490 each closely track the user-accessible input parameters from the GUI components personalized content manager 1700 and personalized layout manager 1800 illustrated in FIGS. 17A through 17E and FIG. 18, and in particular those parameters collected from general tab 1710, news tab 1730, weather tab 1750, traffic tab 1770, sports tab 1790, and the personalized layout manager 1800.

Figure 19:
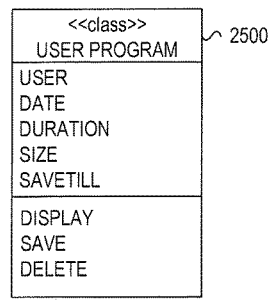
FIG. 19 is a class diagram for a user program in accordance with one embodiment of the present invention.

FIG. 19 shows a class diagram for the data fields associated with customized user programs as provided by the present method and system. User program class 2500 contains data fields used to manage a customized user program, such as the user's identification, date, duration, size, and a save-until date. Additional data fields are provided for control of various operations of the personalized local content system 1300 (e.g., display, save, and delete).

Figure 20:
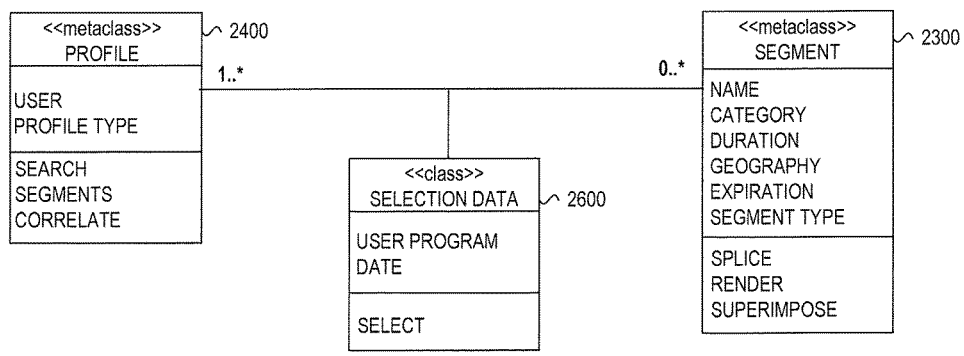
FIG. 20 is an association class diagram for a selection of video segments based on a user profile for a user program in accordance with one embodiment of the present invention.

FIG. 20 provides a class association diagram for carrying out the correlation of various user profiles with various programming segments. Profile metaclass 2400 is correlated with segment metaclass 2300, using, for example, the common inner (or dot) product discussed in connection with FIGS. 8 and 9, or another selection or correlation technique. The results of the correlation procedure are stored in a selection data class 2600 containing data fields for the selection results, the user's identification, the date, and the select procedures used by personalized local content system 1300.

Figure 21:
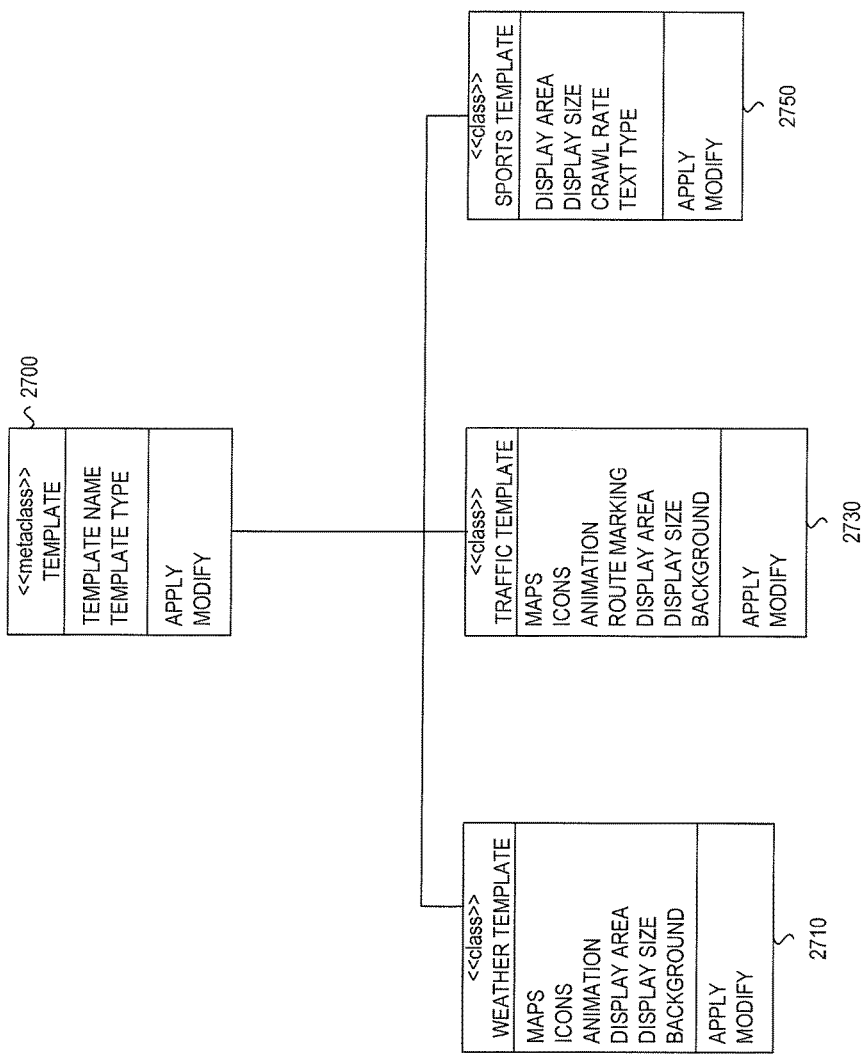
FIG. 21 is a class diagram for templates in accordance with one embodiment of the present invention.

FIG. 21 provides a class diagram for the data fields associated with managing viewing template parameters, such as those used by the render use case 1312 of the personalized local content system 1300 (see FIG. 13). Template metaclass 2700 is the data metaclass used to manage viewing templates and preferably includes data fields used to manage such templates, such as the template name and the template type. Template metaclass 2700 preferably includes three distinct data classes: weather template class 2710, traffic template class 2730, and sports template class 2750. Weather template class 2710 preferably includes data fields used to manage weather viewing templates, such as maps, icons, animation, display area, display size, and background. Traffic template class 2730 preferably includes data fields used to manage traffic viewing templates, such as maps, icons, animation, route marking, display area, display size, and background. Sports template 2750 preferably includes data fields used to manage sports viewing templates, such as display area, display size, crawl rate, and text type. Template metaclass 2700, weather template class 2710, traffic template class 2730, and sports template class 2750 preferably include additional data fields used to control various processes within personalized local content system 1300 (e.g., apply and modify) as carried out, for example, by assemble use case 1310, render use case 1312, and display use case 1316.

Figure 22:
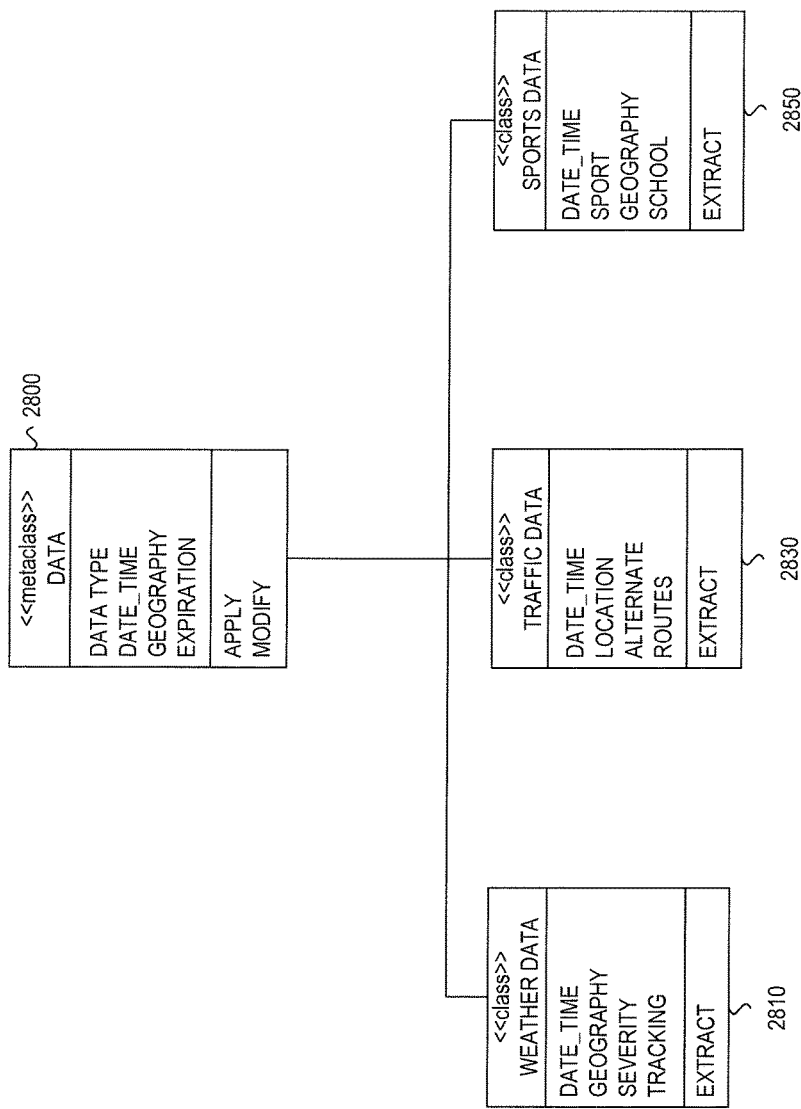
FIG. 22 is a class diagram for data in accordance with one embodiment of the present invention.

FIG. 22 provides a class diagram for the data fields associated with managing various data streams used by the present method and system for various display purposes. Data metaclass 2800 is the metaclass used to manage the various display data and preferably includes data fields used to manage such display data, such as data type, date and time, geography, and expiration. Data metaclass 2800 may preferably include three distinct data classes: weather data class 2810, traffic data class 2830 and sports data class 2850. Weather data class 2810 preferably includes data fields used to manage weather data, such as date and time, geography, severity, and tracking. Traffic data class 2830 preferably includes data fields used to manage traffic data, such as date and time, location, and alternate routes. Sports data class 2850 preferably includes data fields used to manage sports data, such as date and time, sport type, geography, and school or team identification. Data metaclass 2800, weather data class 2810, traffic data class 2830 and sports data class 2850 preferably include additional data fields used to trigger various operations from within personalized local content system 1300 (e.g., extract) as carried out by, for example, select news (for sports news) use case 1304 and select traffic/weather use case 1306.

Figure 23:
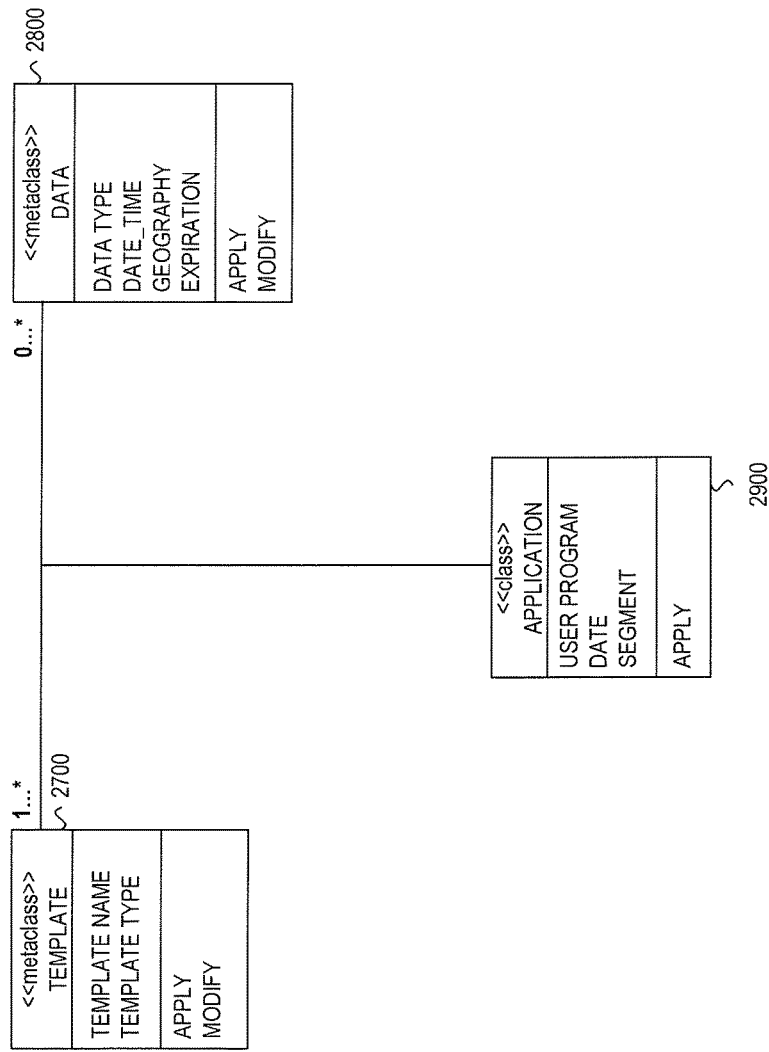
FIG. 23 is an association class diagram for generation of application ready material from templates and data in accordance with one embodiment of the present invention.

FIG. 23 provides a class association diagram for carrying out the correlation of various viewing templates with various data classes. Template metaclass 2700 is correlated with data metaclass 2800, using, for example, the common inner (or dot) product discussed in connection with FIGS. 8 and 9. The results of the correlation procedure are stored in association class 2900 containing data fields for the correlation results, e.g., the user program, the date, the segment name, and an apply procedure used by personalized local content system 1300.

Figure 24:
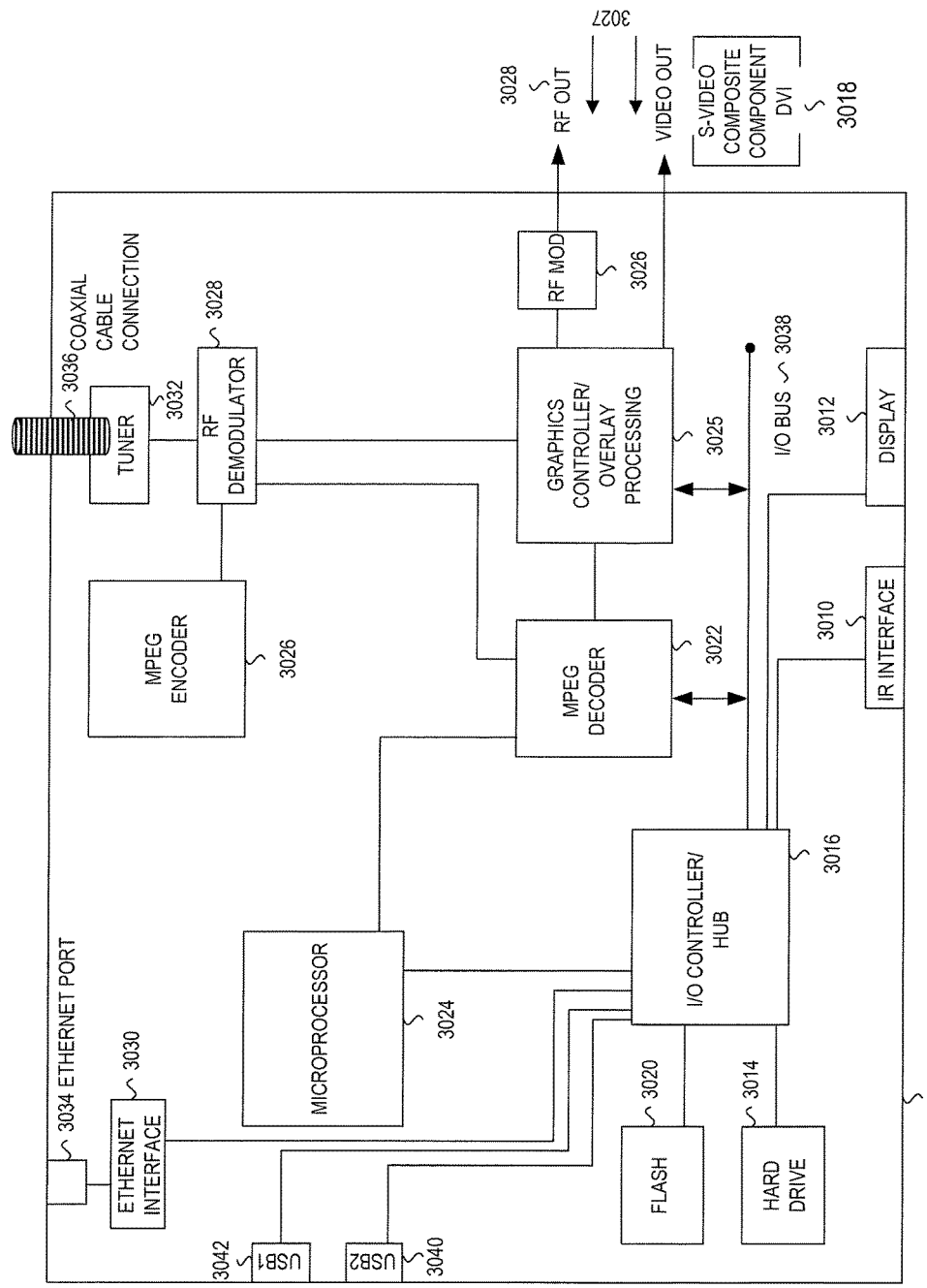
FIG. 24 is a representative block diagram for a Digital Video Recorder (DVR) in accordance with one embodiment of the present invention.

FIG. 24 provides an example circuit schematic for a set-top box that can be used to realize the methods and systems described herein. Set-top box 3000 preferably includes an IR interface 3010 and a display 3012, both of which are connected to I/O controller hub 3016. IR interface 3010 may be used to receive infra-red signals from a remote control device in the user's control, as is generally known in the art. Display 3012 provides various display functions on the state of the set-top box, such as whether the unit is in play mode, record mode, or any of a variety of other status messages. Optionally, display 3012 may also provide various user-accessible buttons or other input means to control the unit, some of which may be duplicated from the signals accessible by IR interface 3010. I/O controller hub 3016 is connected to a microprocessor 3024 and one or more memory units, such as flash memory unit 3020 and hard drive 3014. Flash memory unit 3020 provides a temporary high-access-rate location to store various control signals used by I/O controller hub 3016, and optionally microprocessor 3024, to operate the set-top box 3000. Hard drive 3014 provides a high-capacity, but slower speed, memory storage depot for the storage of programming streams created by the present method and system. Microprocessor 3024 is a standard CPU device, such as a standard programmed ROM microcontroller, that controls the various signals and processes that operate the set-top box 3000.

In one embodiment, the I/O controller hub 3016 is also connected to two serial bus ports SB-1 3042 and SB-2 3040 and an Ethernet interface 3030, with Ethernet interface 3030, in turn, being connected to an Ethernet port 3034, thereby providing set-top box 3000 Ethernet connectivity.

Also attached to I/O controller hub 3016 is an I/O bus 3038, which accesses the various video processing units, including MPEG decoder 3022 and graphics controller/overlay processing unit 3025. Along with MPEG encoder 3026, MPEG decoder 3022 and graphics controller/overlay processing unit 3025 provide the video processing capabilities for the set-top box 3000. Graphics controller/overlay processing unit 3025 is preferably connected to an RF modulator 3027, which interfaces with RF out signal 3028. Additionally, graphics controller/overlay processing unit 3025 produces a video out signal 3018, which, optionally, contains S-video composite components DVI.

Figure 25:
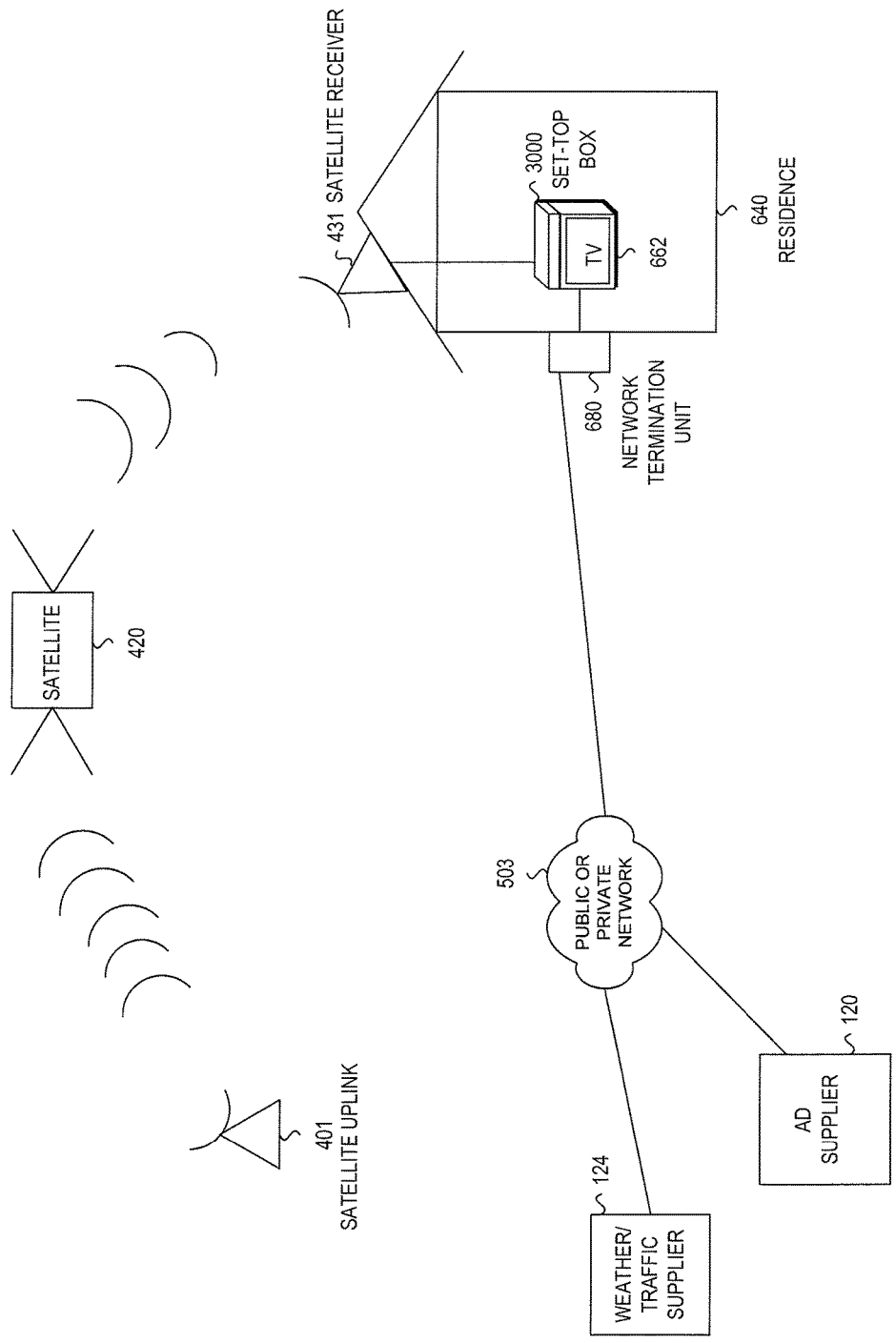
FIG. 25 illustrates a representative architecture for satellite and network based distribution of national and local data, respectively, in accordance with one embodiment of the present invention.

The functions required to select, assemble, render, store, and display the customized video programming as illustrated by the use cases in FIG. 25 can be accomplished in one or more of the functional blocks shown in FIG. 24. For example, microprocessor 3024 can be utilized to select and assemble segments to create subprograms and programs. MPEG decoder 3026 can perform, either alone or in conjunction with microprocessor 3024, appropriate segment shortening as will be discussed with respect to FIG. 31. Similarly, metadata or descriptors associated with video segments, as illustrated in FIG. 7, can be read by microprocessor 3024, MPEG decoder 3026, or the combination thereof.

Graphics controller/overlay processing unit 3025, either alone or in conjunction with microprocessor 3024, can render overlay graphics, superimpose text, or perform other operations necessary to create the types of programming shown in FIGS. 14A-14E.

It should be noted, however, that set-top box 3000 need not be a stand-alone unit, and that the functionality of set-top box 3000 may be incorporated into other electronic devices, such as personal computers, televisions, and other audio-video equipment as would be understood by those skilled in the art.

FIG. 25 depicts another embodiment of the present method and system that relies upon two distinct distribution channels for streaming of media content. Media content can arrive at residence 640 by either passing through a public or private network 503 or by satellite transmission, comprising satellite uplink 401, satellite 420, and satellite receiver 431. Set-top box 3000 combines the various sources of media content and renders it for display on television 662, in accordance with the method and system described herein. As previously described, and as shown in FIG. 25, the network 503 may be connected to various content suppliers, including advertisement supplier(s) 120, news supplier 122, and weather/traffic supplier 124. In a preferred embodiment, a network termination unit 680, as generally known to those of ordinary skill in the art, is located at the residence 640. A residential gateway, acting as a centralized location in the residence for receiving signals, including, in some embodiments, broadcast and network signals, can process and assemble video and graphics for multiple televisions or displays within the residence 640. Combining media content from a network with a satellite transmission is particularly useful for generating localized content for such content categories as traffic and weather. In a preferred embodiment, regional weather information is collected from legacy satellite and satellite uplink, 401, 420, (i.e., legacy weather distribution systems), and combined with local weather information, or information from another category such as traffic, collected from the public or private network 503. Optionally, news programs can be enriched with localized content in this fashion, as can stock or business information. The public or private network 503 may be, in alternative embodiments of the present invention, the Internet, a private network, an intranet, or a special-purpose data network such as the NYSE real-time stock ticker, NOAA weather data service, Bloomberg television news, or a host of other such specialty networks.

Figure 26:
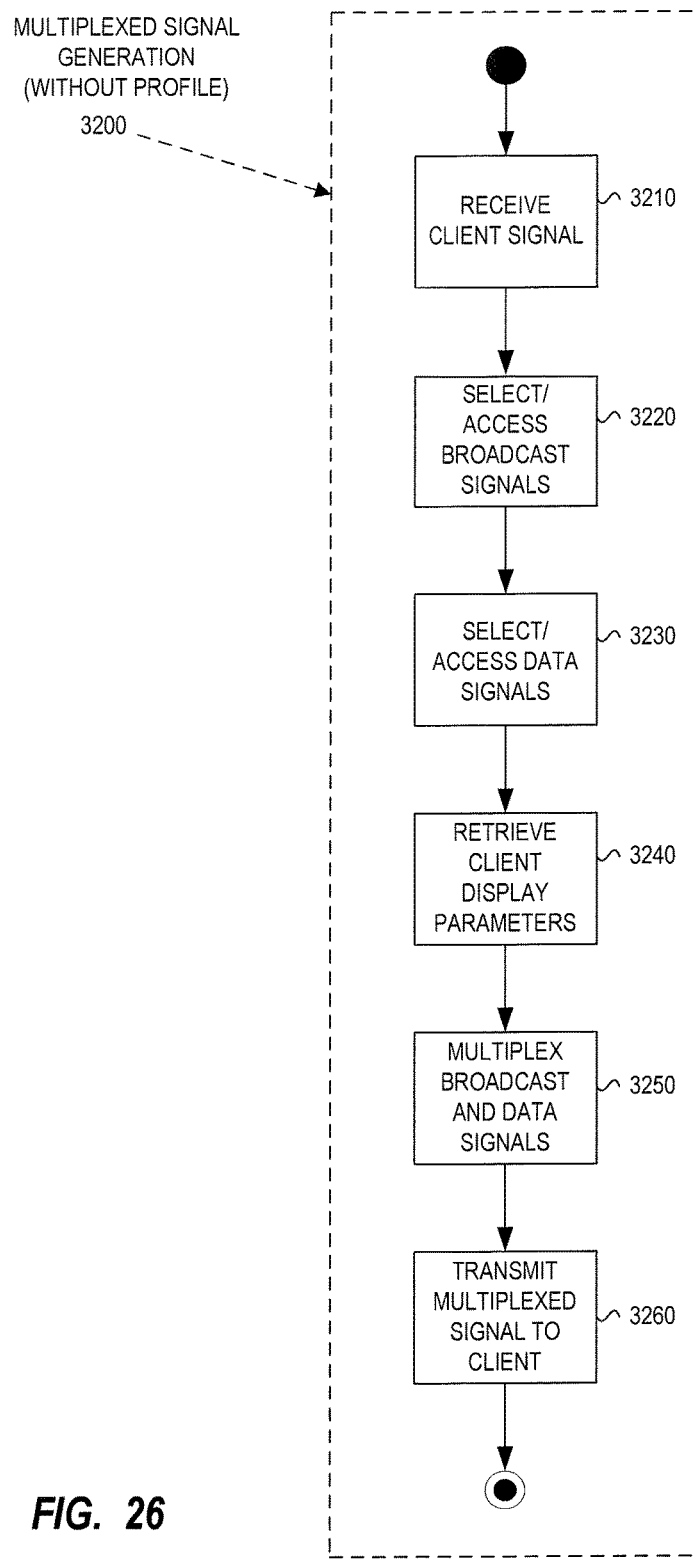
FIG. 26 is a flowchart for generation of a multiplexed broadcast and data signal in accordance with one embodiment of the present invention.

FIG. 26 provides an activity diagram for the process of multiplexed signal generation 3200. Process 3200 includes receiving a client signal at step 3210. Step 3220 involves accessing and selecting the broadcast signals specified in the client signal of step 3210. Data signals are accessed and selected in step 3230, similarly, in accordance with the client signal of step 3210. Display parameters are retrieved in step 3240, and the broadcast signals retrieved in step 3220 and the data signals retrieved in step 3230 are multiplexed in step 3250 in accordance with the display parameters retrieved in step 3240. Finally, the multiplexed signal from step 3250 is transmitted to the client in step 3260.

Figure 27:
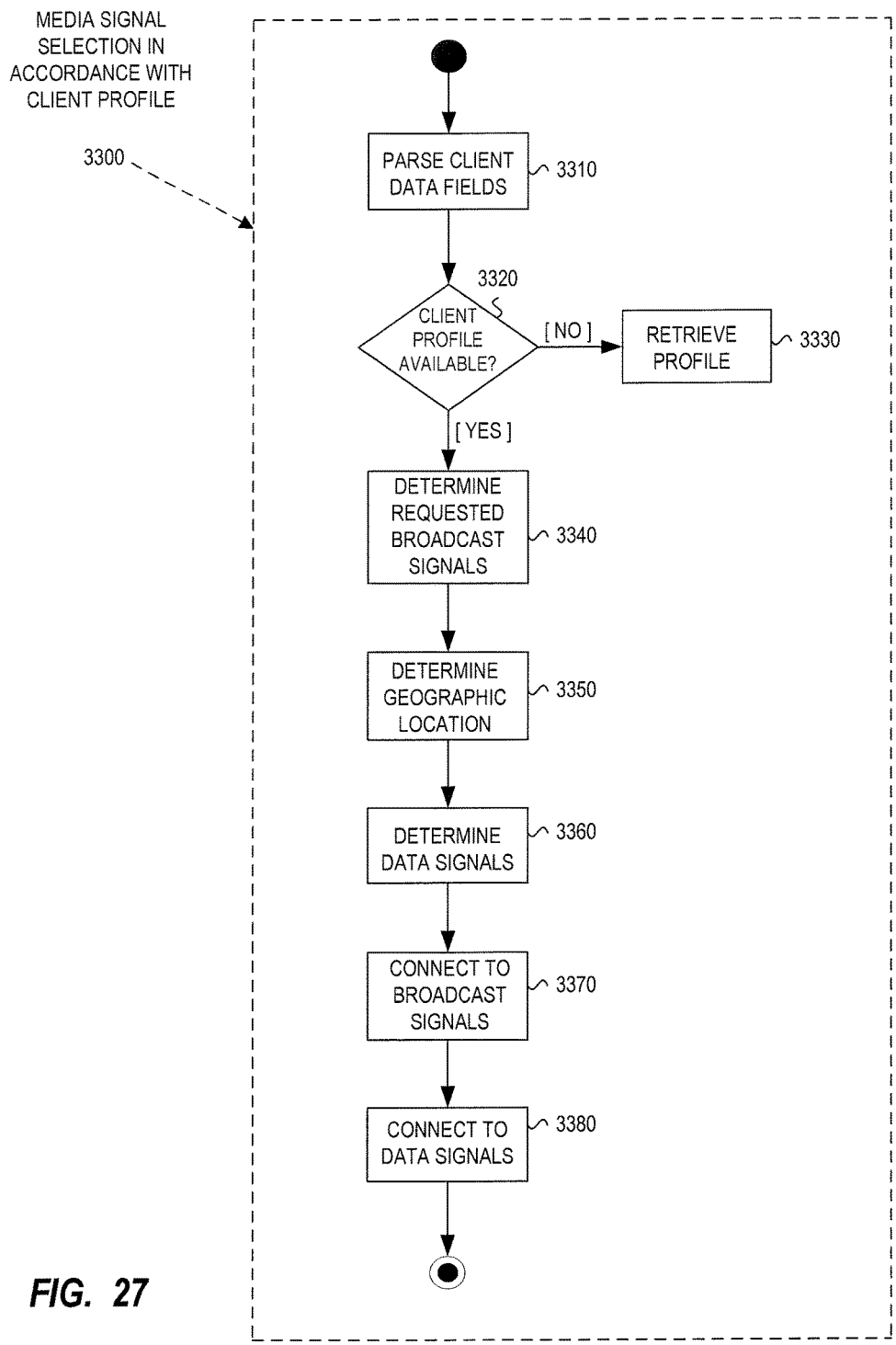
FIG. 27 is a flowchart for selecting and accessing broadcast and data signals based on a client profile in accordance with one embodiment of the present invention.

FIG. 27 provides an activity diagram for the process of media signal selection in accordance with a client profile 3300 to accomplish targeted content multiplexing as illustrated in FIGS. 11 and 12. Process 3300 includes step 3310 in which the client data fields are parsed. If a client profile is available, one is retrieved at step 3330. Otherwise, the process continues at step 3340, wherein the requested broadcast signals are determined. If no profile is available, the broadcast-signal requests are received directly from the client. Proceeding to steps 3350 and 3360, geographic location and data signals are determined, respectively, either from the profile retrieved at step 3330, from direct client input, or through other similar means well known in the art. Proceeding to steps 3370 and 3380, connection is made with the selected data signals and the selected broadcast signals, respectively, and again in accordance with the client profile retrieved in step 3330 or otherwise.

As is known to those skilled in the art, user profiles, also known as consumer or subscriber profiles, contain information regarding the user (including the viewer or consumer), collected from a variety of sources, which allows the user to be better understood and allows for the system to provide information (programming, advertising, product suggestions, or other information or recommendations) which is likely to be of interest to the user. For instance, as to source, data can be self-represented by the user, as is the case when the consumer fills out surveys, product warranty cards, graphical user interfaces as part of product set-up and installation, on-line ordering forms, and otherwise divulges information about him- or herself voluntarily. The user profile, as used herein, also contains the user's preferences regarding the collection, assembly, rendering, and display of personalized content.

Information about the user can also be learned based on interactions with the user including purchases, viewing habits, online habits, or other interactions in which the user makes selections or provides feedback. For example, the user's video selections and their interactions with those video selections (fast-forwarding, deleting) provide an indication as to their preferences, interests, and dislikes. Similarly, the user's purchases (whether online or in a "brick and mortar" store) provide an indication as to their preferences. In one embodiment, heuristic rules, which link the interactions with demographic or behavioral characteristics, can be used to infer characteristics of the user such as gender, age, income level, education level, and occupation, or their possible inclusion in market segments such as empty nesters, double-income-no-kids (DINKs), Gen-Xers or other groups. Similarly, purchase and viewing information can be used to identify users as consumers or potential consumers of specialty food items, alcoholic beverages, convenience meals, or other categories of items. In addition, their purchasing or viewing habits may be used to predict a need for items at a future date, based on previous purchase patterns. In summary, the user profile can be obtained through both self-reported data, analysis of transaction data including purchasing and viewing habits, and by inference from the transaction data.

Once the user profile has been established, it can be used not only to direct the most appropriate programming to the user in the preferred format, but to assist marketers in targeting advertising to groups of users (including market and demographic segments) for which it is most appropriate. In one embodiment of the present method and system, for example, user profiles are accessed from other various systems for the purpose of assisting in the selection not only of tailored advertising but also for the selection of appropriate programming content. In another embodiment, the user specifies their programming, product, and lifestyle interests through Personalized Content Manager 1700, and content, both programming and advertising, is selected in response thereto. In another embodiment, user interaction, as described above, with the present system and method, such as deleted advertisements, channel and volume changes, and routine modifications to the user profile are used for finely honing the selection of content. A user who routinely skips through programming on soccer will be inherently teaching the system and method not to present additional content on soccer, and a similar learning process takes place regarding the selection of advertising.

As will be understood by one skilled in the art, the user profile can be assembled from a variety of sources, can be distributed in nature (with different portions residing at different parts of the network) and can be adequately protected to keep some or all of the user information private.

Figure 28:
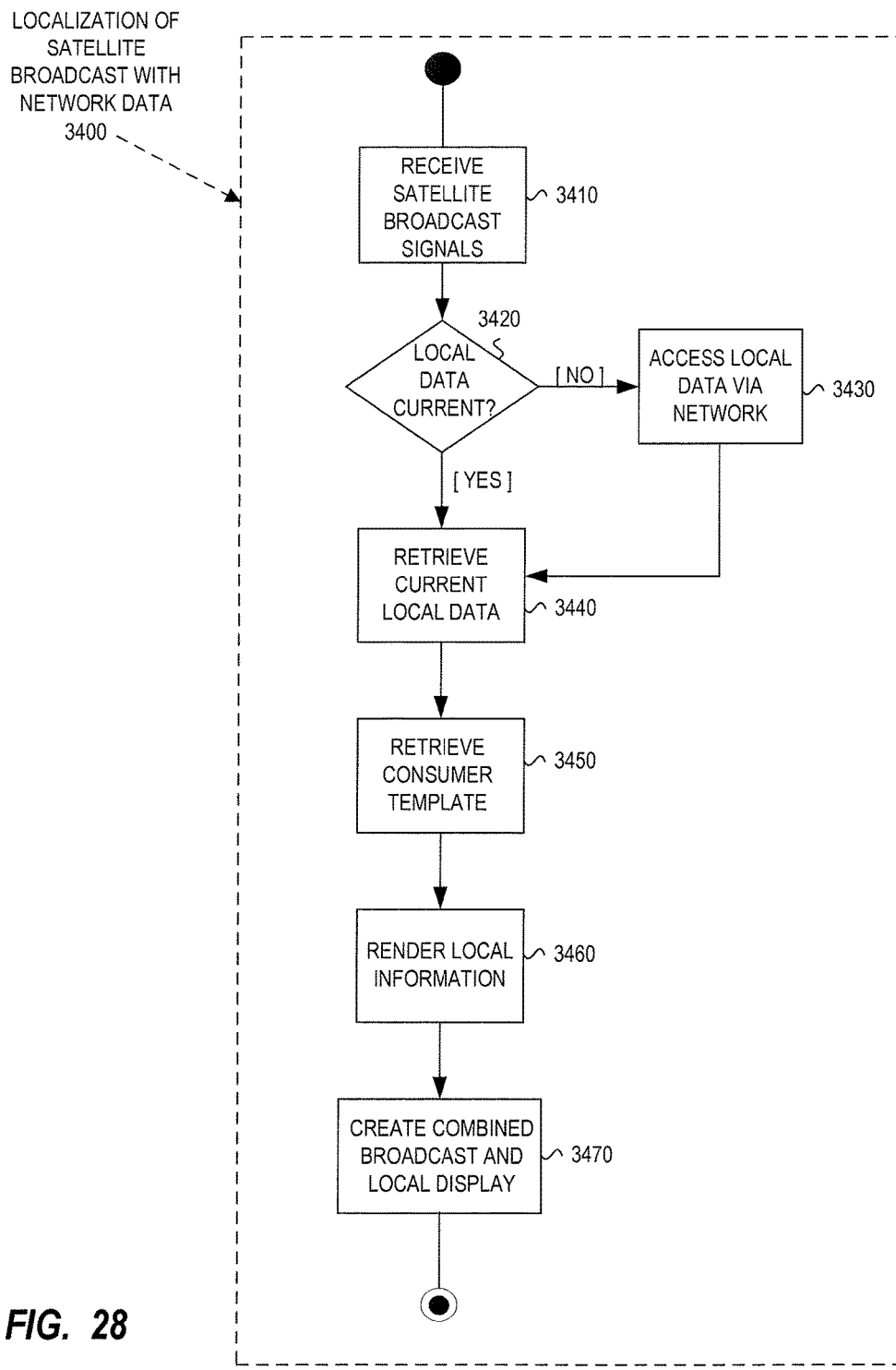
FIG. 28 is a flowchart for the creation of combined broadcast and local display data in accordance with one embodiment of the present invention.

FIG. 28 provides an activity diagram for the process of localizing a satellite broadcast with network data 3400. Process 3400 includes receiving satellite broadcast signals at step 3410. A test at step 3420 determines whether the local data contained in the satellite broadcast signals is current. This determination can be accomplished, for example, by accessing a time stamp in any of a number of typical data or metadata fields contained in the satellite broadcast signals. If the local data is not current, a cache of pertinent local data is accessed via a communications network at step 3430. In either case, step 3440 retrieves the current local data (either from the satellite broadcast signal or from the network). A consumer template is retrieved at step 3450. As illustrated in FIG. 21, templates contain information related to how the user prefers to have his or her data displayed. The local data is rendered into display format at step 3460. Such rendering may occur in a variety of formats and with a variety of options as described elsewhere herein, particularly in reference to the discussion of FIGS. 3A and 14A-14E. These formats include the use of a multi-window display scheme, the use of scrolling text bars at the bottom or on the sides of the display screen, and the use of an avatar and voice simulation to animate text data. The local data is combined or multiplexed with the satellite broadcast data to create a combined broadcast and local display at step 3470.

Figure 29:
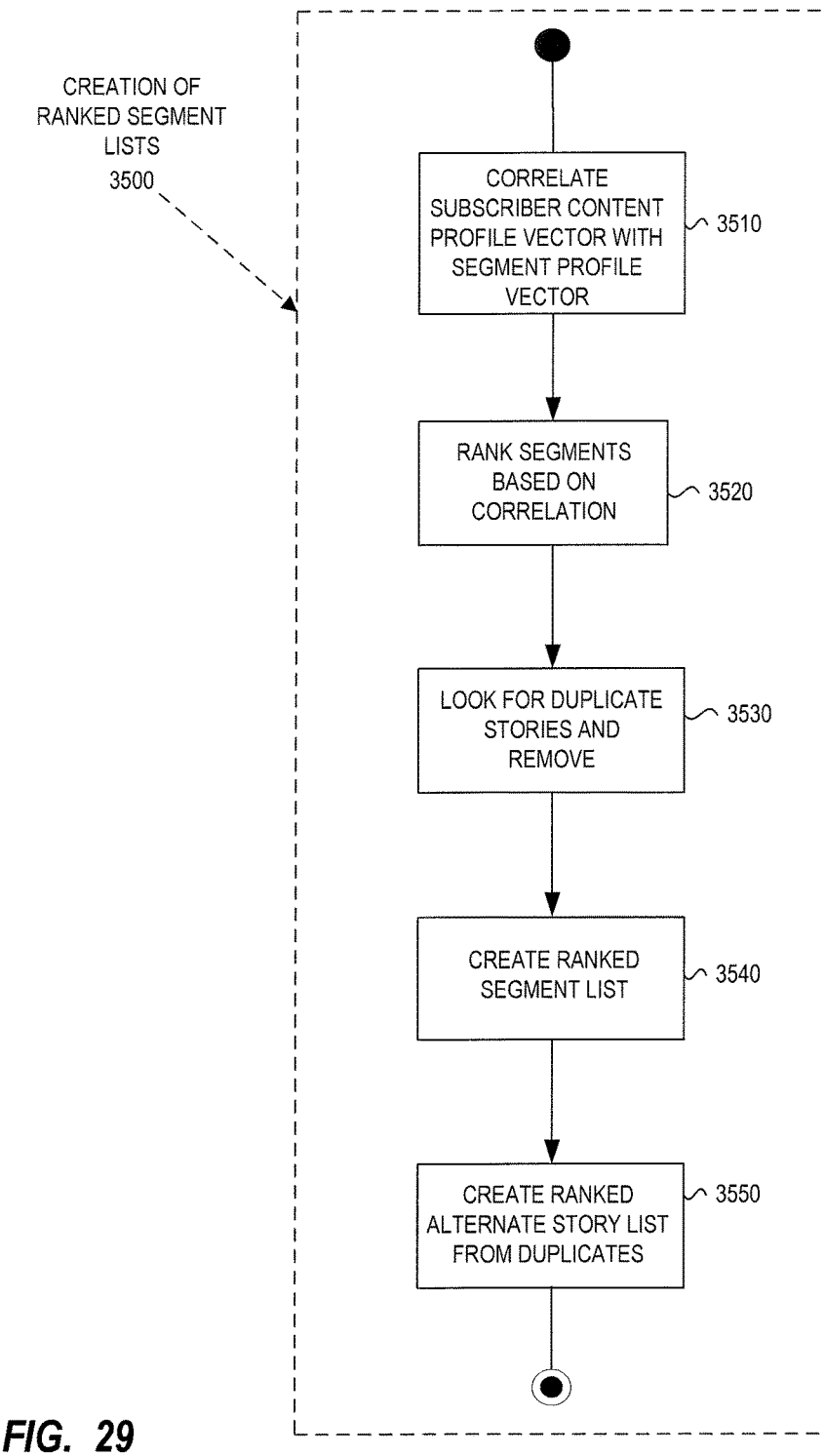
FIG. 29 is a flowchart for the creation of ranked segment lists and alternate story lists in accordance with one embodiment of the present invention.

FIG. 29 provides an activity diagram for the creation of a ranked segment list according to process 3500. The creation of a ranked segment list includes step 3510 wherein a subscriber content profile vector is correlated with a plurality of segment profile vectors. The correlation function of step 3510 was previously described herein with reference to FIG. 9. The segments are ranked in step 3520 based upon the degree of correlation between the segment profile vectors and the subscriber content profile vector. This ranking can be accomplished, for example, by sorting the inner, or dot, product results in descending order for each segment, with the highest product results corresponding to the best correlated segments. Other ranking algorithms, such as binary ranking, linear ranking, high-probability ordering, key ordering, and hash tables, as generally understood by those of ordinary skill in the art, may be used. At step 3530 a search is conducted to locate and remove duplicate segments from the ranked lists. A variety of procedures can be used to perform this searching function, including the statistical analysis of key words, data field identification, and artificial intelligence algorithms.

Recommendation engines can be incorporated into the present method and system and provide an additional means for the selection of video content to incorporate into the personalized video programming. As will be understood by one skilled in the art, a variety of recommendation engines can be utilized, including, but not limited to, non-personalized recommendation engines which base recommendations on the number of recommendations from other users for items in that space, item-to-item recommendation engines which develop recommendations based on relationships between items already consumed or in which the user has shown interest and new items having similar attributes, attribute based recommendation engines which develop recommendations based on attributes or available items or user attributes, content-based recommendation engines which develop recommendations based on features or attributes of times used in combination with rating/feedback of attributes obtained from the consumer, and collaborative filtering recommendation engines which develop recommendations based on items that similar users have rated highly, or for which high number of similar users have consumed. As such, the present method and system can incorporate the output of an internal or external recommendation engine to supplement or replace the user profile, thus allowing personalized local content system 1300 the ability to recommend content and incorporate some or all of that content into the personalized video programming.

Once the duplicate segments are removed, the list of segments can be ordered into a ranked sequence in step 3540. An alternate ranked list can also be created in step 3550, in which additional desirable segments are identified but which have lower correlation scores than the segments on the primary ranked list from step 3540.

Figure 30:
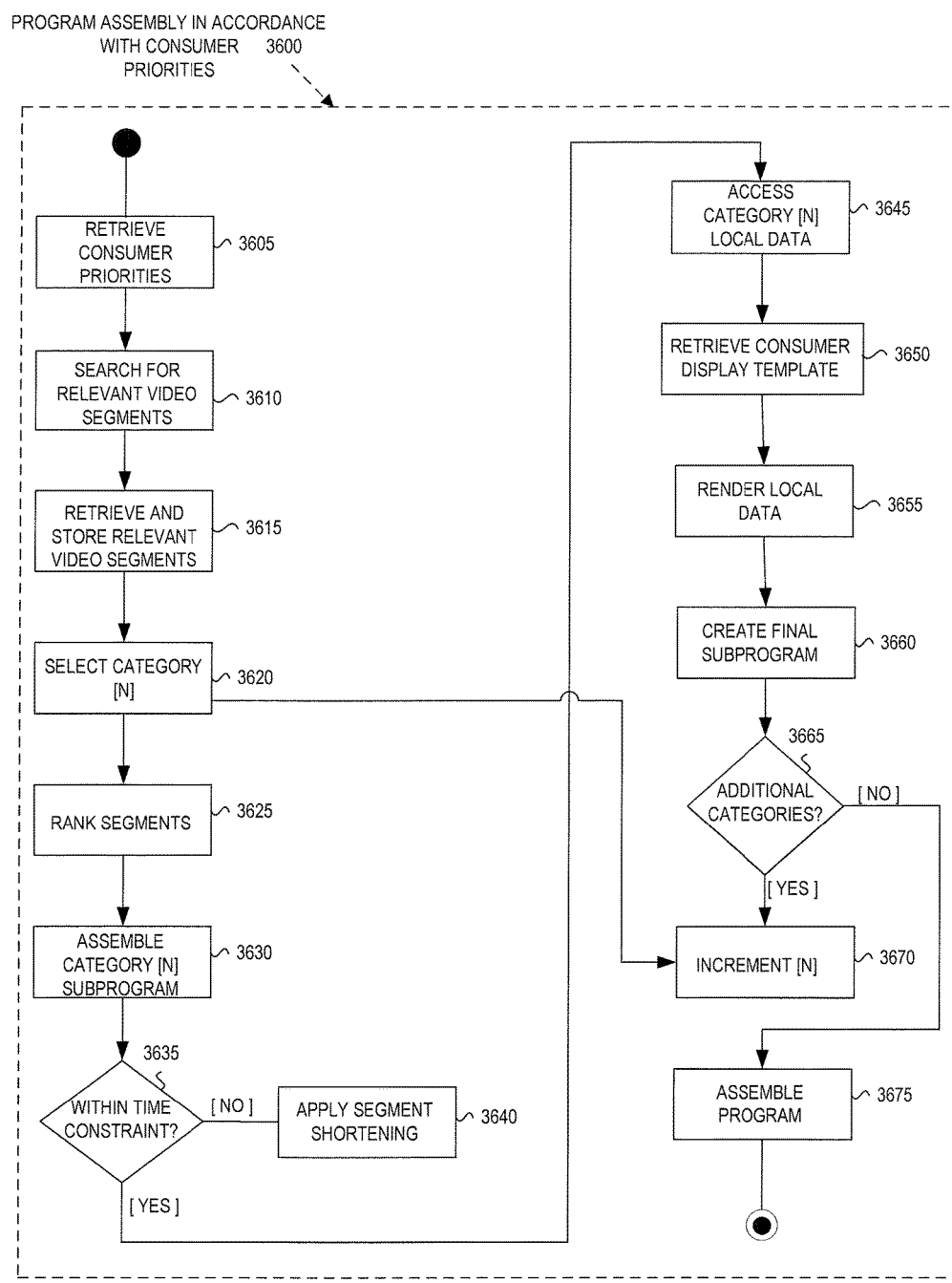
FIG. 30 is a flowchart for personalized program assembly in accordance with one embodiment of the present invention.

FIG. 30 provides an activity diagram for the process 3600 of program assembly in accordance with consumer priorities. Process 3600 includes step 3605 in which consumer priorities are retrieved. A search for relevant video segments is then conducted in step 3610. Once relevant video segments are located, they are retrieved and stored in step 3615.

Figure 31:
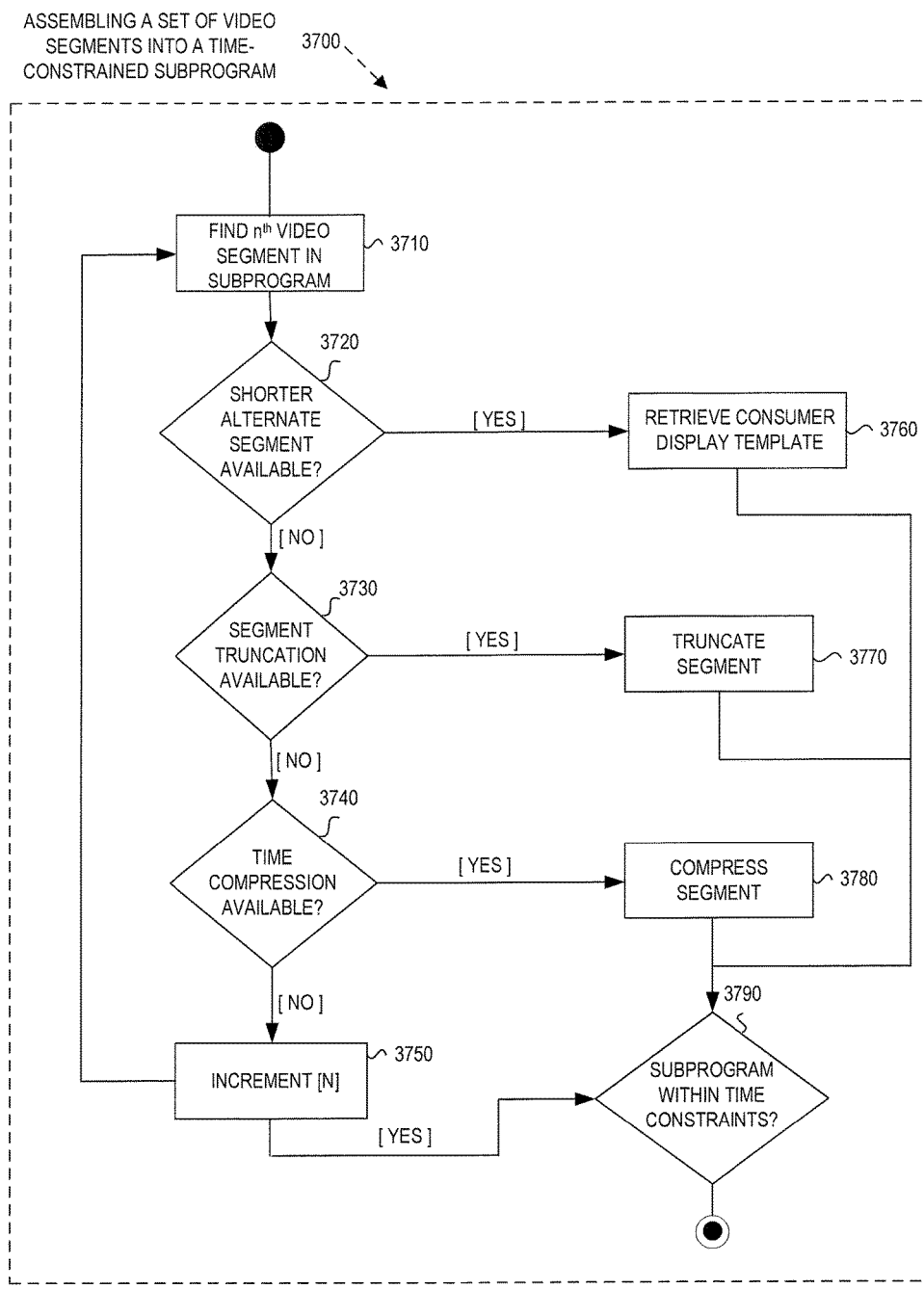
FIG. 31 is a flowchart for segment shortening in accordance with one embodiment of the present invention.

A content category is selected in step 3620 from among the consumer priorities retrieved in step 3605. Segments are ranked in step 3625 using the creation of a ranked segment list according to process 3500 described with respect to FIG. 29. A category subprogram corresponding to the particular category under consideration from the consumer priorities is assembled in step 3630. A test is conducted at step 3635 to determine if the given category subprogram fits within a described time constraint. The time constraint can be either implied from the application or user-specified from the consumer priorities retrieved in step 3605. If the category subprogram does not fit within the time constraint, a segment-shortening algorithm, such as that described with respect to FIG. 31, is applied to the subprogram, and flow continues at step 3625, such that the remaining segments are re-ranked according to a correlation function. Once the category subprogram fits within the time constraint, flow continues to step 3645 to access local data related to the category under consideration. Such local data may be found, in one embodiment of the method and system, on a communications network, such as the Internet or a private intranet. A consumer display template is retrieved at step 3650, and the local data is rendered according to this template at step 3655. After a final subprogram for the given category is assembled at step 3660, a test is made at step 3665 to determine if additional categories remain unprocessed from the consumer priorities retrieved at step 3605. If so, the next category is selected by incrementing the necessary category variable at step 3670 and directing flow back to step 3620 to determine the next category. Once all categories have been processed, the final program is assembled at step 3675 by combining all category subprograms into a final format according to the consumer priorities and display parameters retrieved at steps 3605 and 3650, respectively.

FIG. 31 provides an activities diagram for the process 3700 of fitting a set of video segments into a time-constrained subprogram. Process 3700 includes step 3710, wherein a given video segment is located within a given subprogram, in accordance with an index variable n, representing the nth segment in the subprogram. Step 3720 proceeds by testing whether a shorter alternate segment is available as a replacement for segment n. If a shorter alternate segment is available, segment n is then replaced with the shorter alternative in step 3760. If a shorter alternate segment is not available, a test is made to determine if a process of segment truncation is possible for segment n. Segment truncation can be accomplished, for example, in accordance with any of the processes discussed with respect to FIG. 8, wherein various MPEG splice points can be manipulated and utilized. If segment truncation is possible, the appropriate truncation process is carried out at step 3770. If no truncation is possible, flow continues to step 3740, wherein a final test is made to determine if time compression is available to shorten the length of segment n. Time compression can take the form of any several procedures generally known to those of ordinary skill in the art. If time compression is possible, the appropriate time-compression procedure is carried out at step 3780. If not, flow continues to step 3750, wherein the index variable n is incremented to point to the next video segment in the input subprogram, and flow is directed back to step 3710, wherein the nth video segment is located, and subsequently tested as described above in steps 3720, 3730, and 3740. It should be noted that after each of steps 3760 (replace segment with shorter alternative), 3770 (truncate segment), and 3780 (compress segment), a test is made to determine whether the subprogram conforms to the given time constraint. If it does, process 3700 terminates. If not, flow then proceeds to step 3750 wherein the index variable n is incremented and flow directed back to the beginning of process 3700 at step 3705. In this manner, testing and modification of segments continues until the subprogram fits within the time constraint.

It should be noted, however, that video time compression is but one video editing process whereby the total presentation time of a group of video segments can be shortened, and that other such processes are well known to those of ordinary skill in the video editing arts. At a minimum, and without limitation, those other processes include selecting another video segment (as described above), splice-point truncation techniques, non-linear time compression techniques, and idle-frame deletion techniques.

The embodiments of the present invention may be implemented with any combination of hardware and software. If implemented as a computer-implemented apparatus, the present invention is implemented using means for performing all of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

We claim:

1. A computer-implemented method of creating customized programming content for a user of a video content system, the method comprising:
   (a) analyzing interactions of the user to create a user interest profile for the user, the user interest profile, stored on a non-transitory storage medium, comprising a ranked list of a plurality of interest categories and one or more data fields for each interest category;
   (b) locating and retrieving at least one video segment corresponding to each of the interest categories of the user interest profile and, for each interest category in the user interest profile, identifying one video segment of the at least one video segments with the highest correlation to the one or more data fields for the respective interest category;
   (c) assembling the identified video segments of each interest category in the user interest profile into a customized video programming stream, the video segments ordered in the customized video programming stream based at least in part on the ranking of the plurality of interest categories in the user interest profile; and
   (d) displaying the customized video programming stream to the user.

2. The method of claim 1, further comprising:
   (e) receiving the ranking of the plurality of interest categories from the user.

3. The method of claim 1, wherein the analyzing interactions of the user includes analyzing previous user interaction with the video content system to determine the plurality of interest categories.

4. The method of claim 3, wherein the ranking reflects a prediction of the order in which the user desires to view video segments corresponding to the interest categories.

5. The method of claim 1, further comprising:
   (e) analyzing the user's interactions with the video content system during the display of the customized video programming stream; and
   (f) updating the user interest profile based on the analyzing of (e).

6. The method of claim 1, wherein the at least one video segment is retrieved via the Internet.

7. The method of claim 1, wherein the at least one video segment is retrieved by being recorded by a digital video recorder (DVR).

8. The method of claim 1 further comprising:
   (e) determining the current geographic location of the user, wherein the received video segments include at least one geographically relevant video segment relevant to the current geographic location and wherein the customized programming stream includes the at least one geographically relevant video segment.

9. A computer program product, comprising a non-transitory computer usable medium having a computer readable program code embodied therein, said computer readable program code adapted to be executed to implement a method of creating customized programming content a user of a video content system, said method comprising:
   (a) analyzing interactions of the user to create a user interest profile for the user, the user interest profile comprising a ranked list of a plurality of interest categories and one or more data fields for each interest category;
   (b) locating and retrieving at least one video segment corresponding to each of the interest categories of the user interest profile and, for each interest category in the user interest profile, identifying one video segment of the at least one video segments with the highest correlation to the one or more data fields for the respective interest category;
   (c) assembling the identified video segments of each interest category in the user interest profile into a customized video programming stream, the video segments ordered in the customized video programming stream based at least in part on the ranking of the plurality of interest categories in the user interest profile; and
   (d) displaying the customized video programming stream to the user.

10. The computer program product of claim 9, further comprising:
    (e) receiving the ranking of the plurality of interest categories from the user.

11. The computer program product of claim 9, wherein the analyzing interactions of the user includes analyzing previous user interaction with the video content system to determine the plurality of interest categories.

12. The computer program product of claim 11, wherein the ranking reflects a prediction of the order in which the user desires to view video segments corresponding to the interest categories.

13. The computer program product of claim 9, further comprising:
  (e) analyzing the user's interactions with the video content system during the display of the customized video programming stream; and
  (f) updating the user interest profile based on the analyzing of (e).

14. A customized programming content creation system comprising:
  a video content search engine configured to locate and retrieve video segments from a plurality of video content sources;
  a hardware storage device configured to store retrieved video segments;
  a remote user input interface; and
  a processor configured to:
  (i) analyze the input received via the remote user input interface to create a user interest profile for a user, the user interest profile comprising a ranked list of a plurality of interest categories and one or more data fields for each interest category;
  (ii) direct the video content search engine to locate and retrieve at least one video segment corresponding to each of the interest categories of the user interest profile, identify for each interest category in the user interest profile, one video segment of the at least one video segments with the highest correlation to the one or more data fields for the respective interest category in the user interest profile, and facilitate storing the identified video segment at the storage device; and
  (iii) assemble the identified video segments of each interest category in the user interest profile into a customized video programming stream, the video segments ordered in the customized video programming stream based at least in part on the ranking of the plurality of interest categories in the user interest profile.

15. The system of claim 14, further comprising:
  a display processor for displaying the customized video programming stream to the user.

16. The system of claim 15, the processor further configured to analyze previous user interaction with the content creation system to determine the plurality of interest categories.

* * * * *